(12) United States Patent
Fujii et al.

(10) Patent No.: US 8,925,390 B2
(45) Date of Patent: Jan. 6, 2015

(54) ULTRASONIC FLUID-MEASURING STRUCTURE AND ULTRASONIC FLUID-MEASURING APPARATUS

(75) Inventors: Yuuji Fujii, Nara (JP); Hajime Miyata, Shiga (JP); Yukinori Ozaki, Nara (JP); Aoi Watanabe, Nara (JP)

(73) Assignee: Panasonic Corporation, Osaka (JO)

( * ) Notice: Subject to any disclaimer, the term of this patent is extended or adjusted under 35 U.S.C. 154(b) by 232 days.

(21) Appl. No.: 13/511,433

(22) PCT Filed: Feb. 4, 2010

(86) PCT No.: PCT/JP2010/000692
§ 371 (c)(1),
(2), (4) Date: May 23, 2012

(87) PCT Pub. No.: WO2011/064905
PCT Pub. Date: Jun. 3, 2011

(65) Prior Publication Data
US 2012/0272750 A1    Nov. 1, 2012

(30) Foreign Application Priority Data
Nov. 24, 2009  (JP) ................. 2009-266425

(51) Int. Cl.
*G01F 1/20* (2006.01)
*G01F 1/66* (2006.01)

(52) U.S. Cl.
CPC ............. *G01F 1/662* (2013.01); *G01F 1/667* (2013.01)
USPC ................................... 73/861.18

(58) Field of Classification Search
USPC ........................ 73/861.27–861.29
See application file for complete search history.

(56) References Cited

U.S. PATENT DOCUMENTS

| 4,286,470 A * | 9/1981 | Lynnworth ............... 73/861.18 |
| 6,189,389 B1 | 2/2001 | van Bekkum et al. |
| 7,237,441 B2 | 7/2007 | Umekage et al. |
| 7,360,449 B2 | 4/2008 | Umekage et al. |
| 8,141,434 B2 * | 3/2012 | Kippersund et al. ....... 73/861.28 |

FOREIGN PATENT DOCUMENTS

| JP | 58-162815 A | 9/1983 |
| JP | 62-000811 A | 1/1987 |
| JP | 09-021666 A | 1/1997 |

(Continued)

OTHER PUBLICATIONS

U.S. Appl. No. 13/511,443, Fujii, Yuuii filed May 23, 2012.*

(Continued)

*Primary Examiner* — Jewel V Thompson
(74) *Attorney, Agent, or Firm* — Brinks Gilson & Lione

(57) ABSTRACT

Provided are an ultrasonic fluid-measuring apparatus and an ultrasonic fluid-measuring apparatus that can prevent the disturbance from occurring in the ultrasonic waves due to disturbance of a fluid. An ultrasonic fluid-measuring structure includes an ultrasonic measuring section adjacent to a channel member. The channel member includes a first ultrasonic wave input/output section and a second ultrasonic wave input/output section provided in a first side wall part, and a reflecting surface provided on an inner surface of the second side wall part. Further, it is configured so that the first ultrasonic wave input/output section and the second ultrasonic wave input/output section are adjacent to each other, and an ultrasonic wave transmission membrane through which the ultrasonic waves pass covers together both the first ultrasonic wave input/output section and the second ultrasonic wave input/output section.

13 Claims, 20 Drawing Sheets

(56) References Cited

FOREIGN PATENT DOCUMENTS

| JP | 11-510610 A | 9/1999 |
| JP | 2004-279224 A | 10/2004 |
| JP | 2005-257444 A | 9/2005 |
| JP | 2005-283565 A | 10/2005 |
| JP | 2008-111690 A | 5/2008 |

OTHER PUBLICATIONS

International Search Report for International Application No. PCT/JP2010/000692, dated May 11, 2010, 2 pages.

\* cited by examiner

US 8,925,390 B2

ULTRASONIC FLUID-MEASURING STRUCTURE AND ULTRASONIC FLUID-MEASURING APPARATUS

This application is a 371 application of PCT/JP2010/000692 having an international filing date of Feb. 4, 2010, which claims priority to JP 2009-266425 filed Nov. 24, 2009, the entire contents of which are incorporated herein by reference.

TECHNICAL FIELD

The present invention relates to an ultrasonic fluid-measuring structure that measures a flow rate of a fluid by providing a channel member along a flow direction of a fluid, placing an ultrasonic measuring section adjacent to the channel member, transmitting ultrasonic waves to a reflecting surface of the channel member with the ultrasonic measuring section and receiving ultrasonic waves reflected by the reflecting surface with the ultrasonic measuring section, and an ultrasonic fluid-measuring apparatus including the ultrasonic fluid-measuring structure.

BACKGROUND ART

As a general V-path ultrasonic fluid-measuring apparatus, an apparatus is known in which a channel member is accommodated in an accommodating section of a measuring channel, and a first ultrasonic wave measuring section and a second ultrasonic wave measuring section are provided adjacent to each other in the channel member.

That is, as the channel member is formed in a square tube shape by a first side wall part, a second side wall part, a top plate part, and a bottom plate part, a fluid channel (hereinafter referred to as a "channel") is formed by the channel member. A first ultrasonic wave output section and a second ultrasonic wave output section are provided adjacent to each other in the first side wall part, and the first ultrasonic wave output section and the second ultrasonic wave output section are arranged so as to face the channel.

Additionally, the second side wall part is provided with a reflecting surface, and the reflecting surface is arranged so as to face the channel (for example, refer to Patent Literature 1).

CITATION LIST

Patent Literature

Patent Literature 1: JP-A-2004-279224

SUMMARY OF INVENTION

Technical Problem

In an ultrasonic fluid-measuring apparatus 120 in Patent Literature 1, as shown in FIG. 24, a channel 122 is formed by a channel member 121.

Ultrasonic waves 127 transmitted from a first transmitter/receiver 123 are reflected by a reflecting surface 128 and are transmitted in the shape of the letter V (V-path) up to a second transmitter/receiver 125, and the transmitted ultrasonic waves 127 are received by the second transmitter/receiver 125.

On the other hand, ultrasonic waves 129 transmitted from the second transmitter/receiver 125 are reflected by the reflecting surface 128 and are transmitted in the shape of the letter V (V-path) up to the first transmitter/receiver 123, and the transmitted ultrasonic waves 129 are received by the first transmitter/receiver 123.

The flow rate of a fluid 131 that flows through the inside of the channel 122 is calculated, on the basis of the ultrasonic waves (signals) received by the first transmitter/receiver 123 and the second transmitter/receiver 125.

Incidentally, a first ultrasonic wave output section 135 and a second ultrasonic wave output section 136 are provided at a predetermined interval in a first side wall part 133.

Hence, a pillar portion 137 is provided between the first ultrasonic wave output section 135 and the second ultrasonic wave output section 136 in the first side wall part 133. The pillar portion 137 is a portion that protrudes (overhangs) toward the channel 122.

For this reason, when the fluid 131 flows into the channel 122, there is a possibility that disturbance 155 may occur in the fluid 131 due to steps 141 and 143 and gaps 142 and 144 that are formed by the pillar portion 137.

Here, the steps 141 and 143 and the gaps 142 and 144 are present inside an included angle θ2 of the ultrasonic waves 127 that are transmitted in the shape of the letter V (V-path) and inside of the included angle θ2 of the ultrasonic waves 129 that are transmitted in the shape of the letter V (V-path). There is also a possibility that disturbance that occurs inside the included angle θ2 of the ultrasonic waves 127 or the ultrasonic waves 129 may disturb the ultrasonic waves.

The present invention has been made in order to solve the aforementioned problems, and an object thereof is to provide an ultrasonic fluid-measuring structure and an ultrasonic fluid-measuring apparatus that can prevent disturbance from occurring in ultrasonic waves due to disturbance of a fluid.

Solution to Problem

An ultrasonic fluid-measuring structure according to the invention includes: a channel member in which a rectangular opening is continuous along a flow direction of a fluid; and an ultrasonic measuring section adjacent to the channel member, wherein the channel member includes a first side wall part adjacent to the ultrasonic measuring section, a second side wall part parallel to the first side wall part, a top plate part and a bottom plate part bridged between the first side wall part and the second side wall part, a first ultrasonic wave input/output section and a second ultrasonic wave input/output section provided in the first side wall part, and a reflecting surface provided on an inner surface of the second side wall part, the ultrasonic measuring section includes a first transmitter/receiver that transmits ultrasonic waves to the reflecting surface through the first ultrasonic wave input/output section and receives the ultrasonic waves reflected by the reflecting surface, and a second transmitter/receiver that transmits the ultrasonic waves to the reflecting surface through the second ultrasonic wave input/output section and receives the ultrasonic waves reflected by the reflecting surface, and the first ultrasonic wave input/output section and the second ultrasonic wave input/output section are adjacent to each other, and an ultrasonic wave transmission membrane through which the ultrasonic waves pass covers both the first ultrasonic wave input/output section and the second ultrasonic wave input/output section together.

In the invention, the first ultrasonic wave input/output section and the second ultrasonic wave input/output section are provided so as to be adjacent to each other, and the first ultrasonic wave input/output section and the second ultrasonic wave input/output section are adapted so as to be covered both together with the ultrasonic wave transmission membrane.

Incidentally, as the ultrasonic waves are transmitted to the reflecting surface through the first ultrasonic wave input/output section from the first transmitter/receiver, and the ultrasonic waves reflected by the reflecting surface are received by the second transmitter/receiver, the ultrasonic waves are transmitted in the shape of the letter V (V-path).

On the other hand, as the ultrasonic waves are transmitted to the reflecting surface through the second ultrasonic wave input/output section from the second transmitter/receiver, and the ultrasonic waves reflected by the reflecting surface are received by the first transmitter/receiver, the ultrasonic waves are transmitted in the shape of the letter V (V-path).

Here, as mentioned above, by covering together both the first ultrasonic wave input/output section and the second ultrasonic wave input/output section with the ultrasonic wave transmission membrane, a region inside the ultrasonic waves, which are transmitted in the shape of the letter V, can be secured flatly.

There is no possibility that a fluid that flows through the inside of the channel member may cause disturbance in the region inside the ultrasonic waves that are transmitted in the shape of the letter V.

This can prevent disturbance from occurring in ultrasonic waves due to disturbance of a fluid.

In the ultrasonic fluid-measuring structure according to the invention, the first side wall part, the second side wall part, the top plate part, and the bottom plate part are integral together.

In the invention, by integrating the first side wall part, the second side wall part, the top plate part, and the bottom plate part together, the number of components can be reduced.

In the ultrasonic fluid-measuring structure according to the invention, the channel member includes a partition plate that divides the inside of the channel member into a plurality of flat channels, and the partition plate is molded integrally with the first side wall part and the second side wall part.

In the invention, by molding the partition plate integrally with the first side wall part and the second side wall part, time and effort for attaching the partition plate to the first side wall part and the second side wall part can be saved.

In the ultrasonic fluid-measuring structure according to the invention, the ultrasonic wave transmission membrane and the partition plate comes into contact with each other.

In the invention, by bringing the ultrasonic wave transmission membrane and the partition plate into contact with each other, the gap between the ultrasonic wave transmission membrane and the partition plate can be eliminated.

Hence, there is no possibility that disturbance may be caused in a fluid at the gap between the ultrasonic wave transmission membrane and the partition plate. This can prevent disturbance from occurring in ultrasonic waves due to disturbance of a fluid.

In the ultrasonic fluid-measuring structure according to the invention, the first ultrasonic wave input/output section and the second ultrasonic wave input/output section are continuous with each other.

In the invention, by making the first ultrasonic wave input/output section and the second ultrasonic wave input/output section continuous with each other, a step portion (pillar portion) can be removed from between the first ultrasonic wave input/output section and the second ultrasonic wave input/output section.

Hence, the ultrasonic wave transmission membrane that covers the first ultrasonic wave input/output section and the second ultrasonic wave input/output section can be selectively provided on either a rear surface side (that is, channel side) of the first side wall part or a front surface side (that is, opposite side of the channel) of the first side wall part.

That is, by providing the ultrasonic wave transmission membrane on the rear surface side of the first side wall part, it is possible to individually configure the first side wall part, the second side wall part, a top plate part, and the bottom plate part, respectively, and integrally assemble the respective members.

On the other hand, by providing the ultrasonic wave transmission membrane on the front surface side of the first side wall part, it is possible to integrally mold the first side wall part, the second side wall part, the top plate part, and the bottom plate part.

This can enhance the degree of freedom in design when the channel member is formed.

An ultrasonic fluid-measuring structure according to the invention includes: a channel member in which a rectangular opening is continuous along a flow direction of a fluid; and an ultrasonic measuring section adjacent to the channel member, wherein the channel member includes a first side wall part adjacent to the ultrasonic measuring section, a second side wall part parallel to the first side wall part, a first ultrasonic wave input/output section and a second ultrasonic wave input/output section provided in the first side wall part, and a reflecting surface provided on an inner surface of the second side wall part, the ultrasonic measuring section includes a first transmitter/receiver that transmits ultrasonic waves to the reflecting surface through the first ultrasonic wave input/output section and receives the ultrasonic waves reflected by the reflecting surface, and a second transmitter/receiver that transmits the ultrasonic waves to the reflecting surface through the second ultrasonic wave input/output section and receives the ultrasonic waves reflected by the reflecting surface, and the first ultrasonic wave input/output section and the second ultrasonic wave input/output section are adjacent to each other.

In the invention, the first ultrasonic wave input/output section and the second ultrasonic wave input/output section are adapted so as to be adjacent to each other.

As mentioned above, as the ultrasonic waves are transmitted to the reflecting surface through the first ultrasonic wave input/output section from the first transmitter/receiver, and the ultrasonic waves reflected by the reflecting surface are received by the second transmitter/receiver, the ultrasonic waves are transmitted in the shape of the letter V (V-path).

On the other hand, as the ultrasonic waves are transmitted to the reflecting surface through the second ultrasonic wave input/output section from the second transmitter/receiver, and the ultrasonic waves reflected by the reflecting surface are received by the first transmitter/receiver, the ultrasonic waves are transmitted in the shape of the letter V (V-path).

Here, by adapting the first ultrasonic wave input/output section and the second ultrasonic wave input/output section so as to be adjacent to each other, it is possible to continuously provide the first ultrasonic wave input/output section and the second ultrasonic wave input/output section.

Hence, the step portion (pillar portion) can be removed from between the first ultrasonic wave input/output section and the second ultrasonic wave input/output section, and a region inside the ultrasonic waves, which are transmitted in the shape of the letter V, can be secured flatly.

Thereby, there is no possibility that the fluid that flows through the inside of the channel member may be disturbed in the region inside the ultrasonic waves that are transmitted in the shape of the letter V, and disturbance can be prevented from occurring in the ultrasonic waves due to disturbance of the fluid.

In the ultrasonic fluid-measuring apparatus according to the invention, the ultrasonic fluid-measuring structure is used.

In the invention, by using the ultrasonic fluid-measuring structure for the ultrasonic fluid-measuring apparatus, it is possible to provide an ultrasonic fluid-measuring apparatus that can prevent disturbance from occurring in the ultrasonic waves due to disturbance of a fluid.

This enables the flow rate of a fluid to be precisely measured by the ultrasonic fluid-measuring apparatus.

Advantageous Effects of Invention

According to the ultrasonic fluid-measuring structure and the ultrasonic fluid-measuring apparatus in the invention, the effect that disturbance can be prevented from occurring in the ultrasonic waves due to disturbance of a fluid is exhibited by covering together both the first ultrasonic wave input/output section and the second ultrasonic wave input/output section with the ultrasonic wave transmission membrane and flatly securing the region inside the ultrasonic waves that are transmitted in the shape of the letter V.

DESCRIPTION OF EMBODIMENTS

Figure 1:
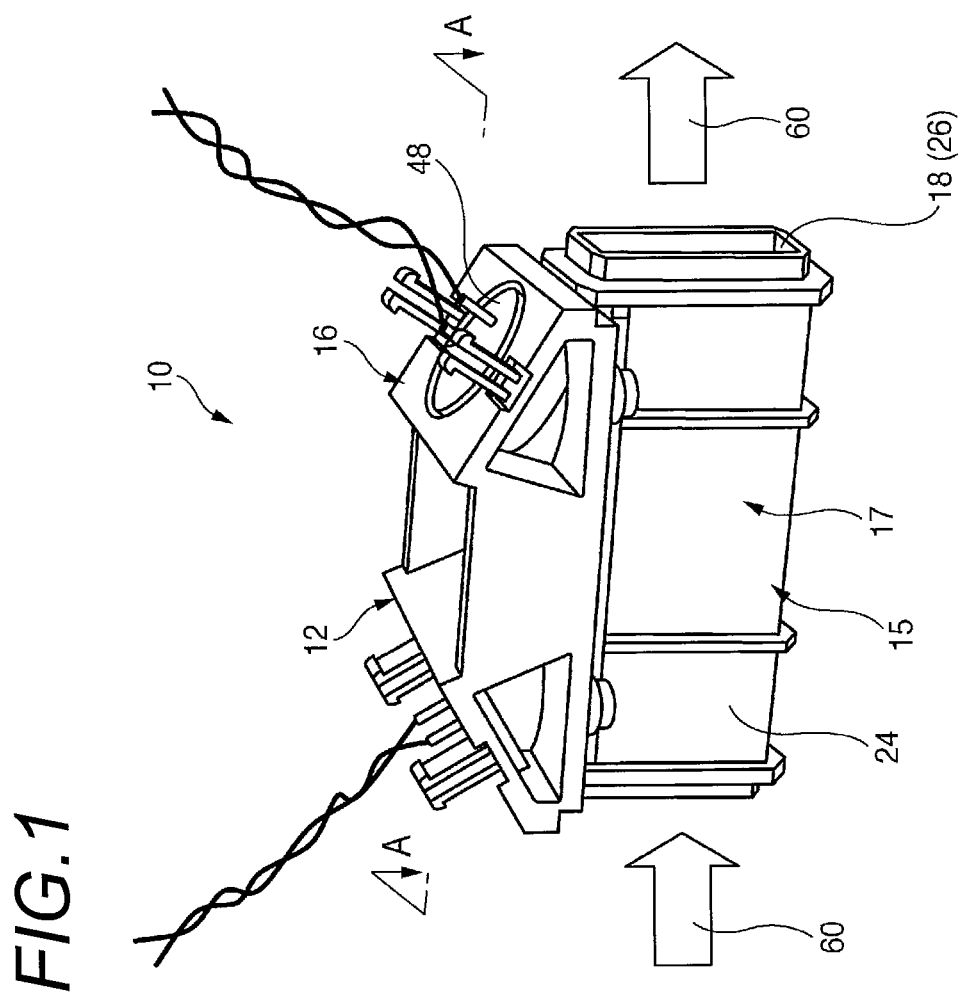
FIG. 1 is a perspective view showing an ultrasonic fluid-measuring apparatus according to a first embodiment of the invention.
Figure 2:
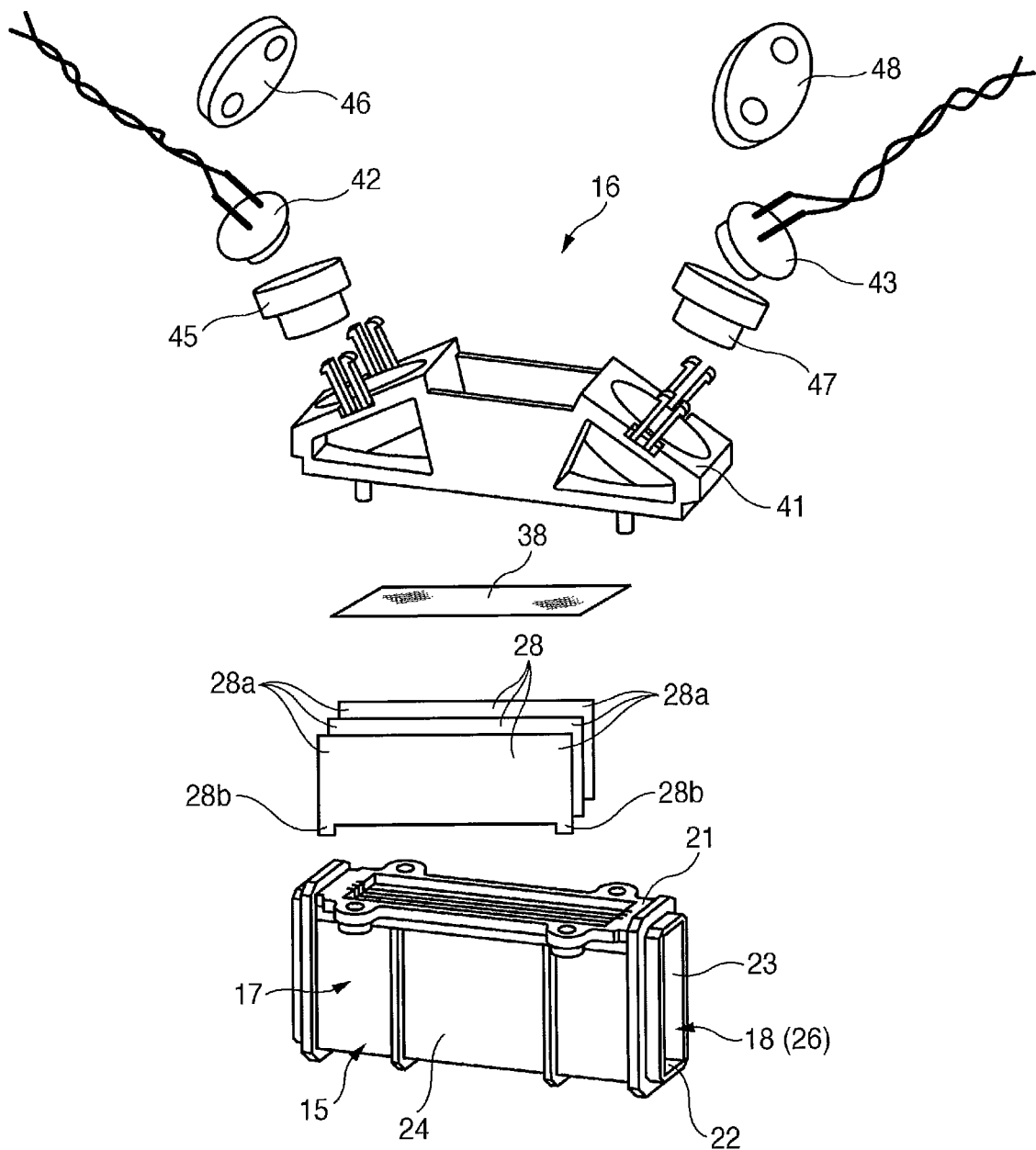
FIG. 2 is an exploded perspective view showing the ultrasonic fluid-measuring structure in FIG. 1.

An ultrasonic fluid-measuring apparatus 10 and channel members 15, 70, 80, 90, 100, 110, 130, and 140 according to a plurality of embodiments of the invention will be described below with reference to the drawings.

First Embodiment

As shown in FIGS. 1 to 5, the ultrasonic fluid-measuring apparatus 10 that is a first embodiment of the invention includes an ultrasonic fluid-measuring structure 12 that measures a flow rate of a fluid.

The ultrasonic fluid-measuring structure 12 includes a channel member 15, and an ultrasonic measuring section 16 adjacent to the channel member 15.

The channel member 15 has a channel body (body) 17 in which a rectangular opening 18 is continuous along a flow direction of the fluid.

The channel body 17 has a first side wall part 21 adjacent to the ultrasonic measuring section 16, a second side wall part 22 parallel to the first side wall part 21, a top plate part 23 bridged over top portions of the first side wall part 21 and the second side wall part 22, and a bottom plate part 24 bridged over bottom portions of the first side wall part 21 and the second side wall part 22.

The first side wall part 21, the second side wall part 22, the top plate part 23, and the bottom plate part 24 are formed integrally (specifically, resin-molded), and are resinous members in which a square tube type channel 26 (that is, "channel in which the rectangular opening 18 is continuous along the flow direction of a fluid") is formed by the first side wall part 21, the second side wall part 22, the top plate part 23, and the bottom plate part 24.

The channel body 17 has a plurality of partition plates 28 that divide the inside of the channel body 17 (that is, channel 26) into a plurality of flat channels 27, a first ultrasonic wave input/output section 32 and a second ultrasonic wave input/output section 33 provided adjacent to each other in the first side wall part 21, a reflecting surface 35 provided on the inner surface of the second side wall part 22, and an ultrasonic wave transmission membrane 38 that covers the first ultrasonic wave input/output section 32 and the second ultrasonic wave input/output section 33.

When the channel body 17 is resin-molded, the plurality of partition plates 28 are molded integrally (insert-molded) with the first side wall part 21 and the second side wall part 22.

Figure 7:
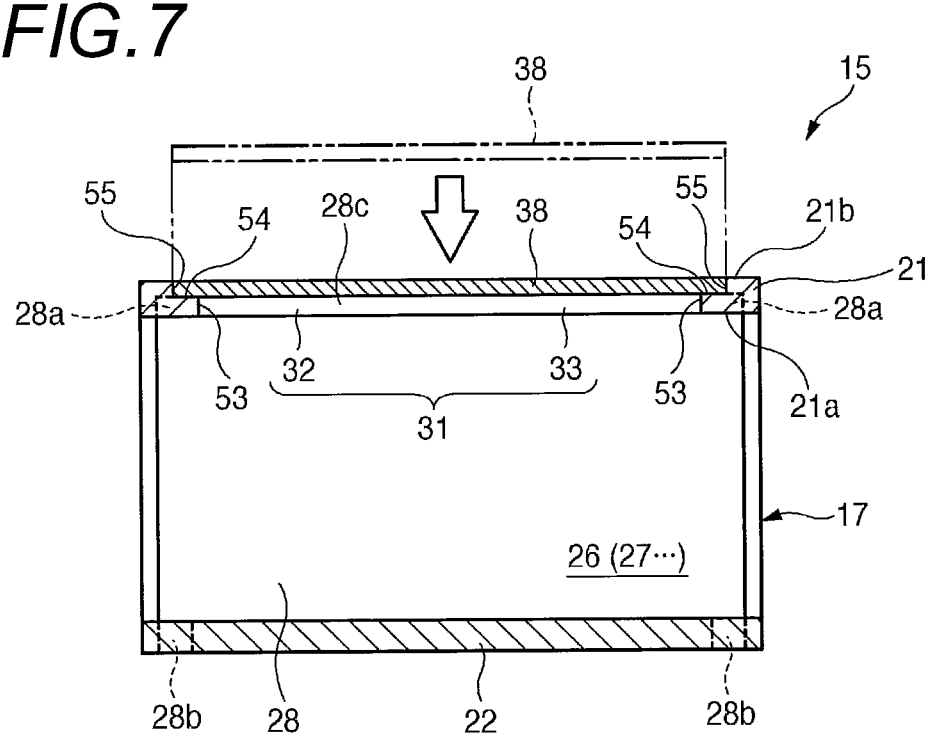
FIG. 7 is a cross-sectional view taken along a line D-D in FIG. 5.
Figure 8:
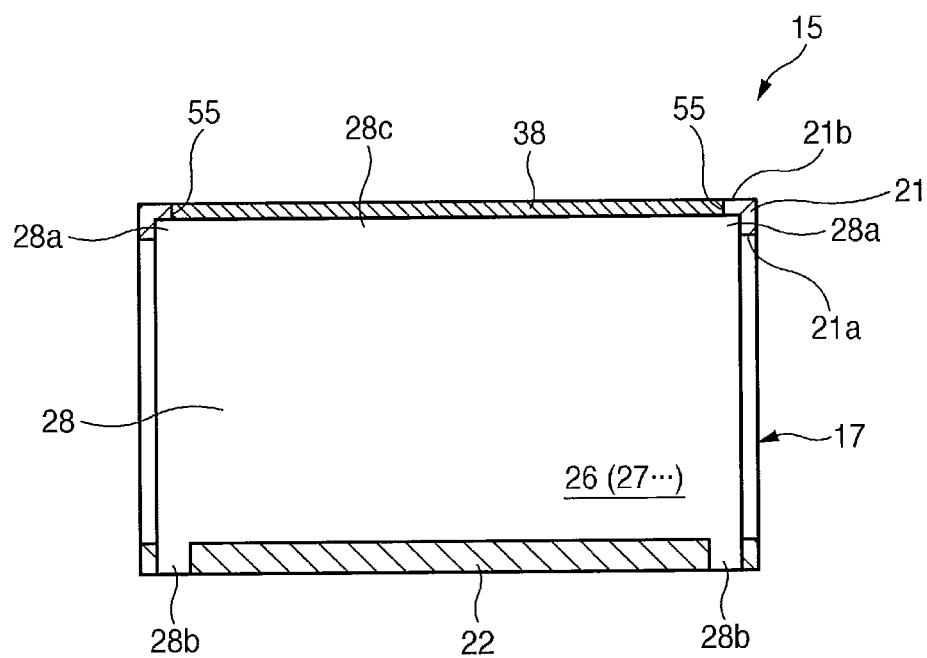
FIG. 8 is a cross-sectional view taken along a line E-E in FIG. 5.

Specifically, integral molding (insert molding) is performed in a state where upper corner portions 28a of the plurality of partition plates 28 are molded integrally (insert-molded) with the first side wall part 21, and as shown in FIGS. 7 and 8, lower protruding pieces 28b of the plurality of partition plates 28 are passed through the second side wall part 22 and tips thereof do not protrude to the outside of the second side wall part 22.

The relative positions of the partition plates 28 with respect to a mold are maintained by making the upper corner portions 28a and the tips of the lower protruding pieces 28b abut on the inner surface of the mold. Then, by injecting resin into the mold in this state, the partition plates can be positioned easily at predetermined positions with respect to the channel body 17.

Figure 6:
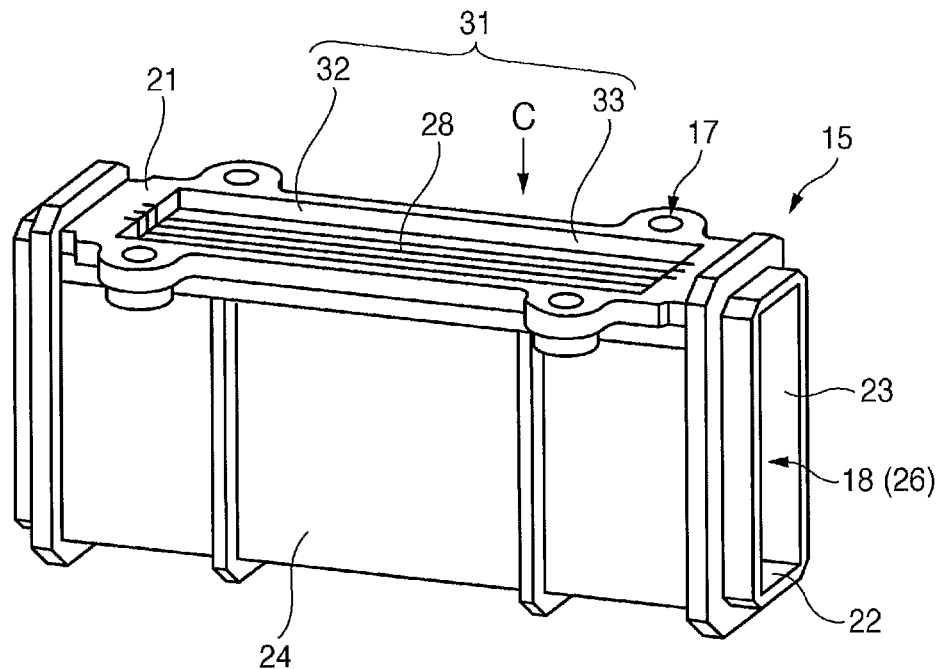
FIG. 6 is a perspective view showing a fluid member according to the first embodiment.

Here, in the first embodiment, as shown in FIGS. 6 to 8, an ultrasonic wave input/output section 31 is formed as the first ultrasonic wave input/output section 32 and the second ultrasonic wave input/output section 33, which are adjacent to each other, are formed continuously.

Both the first ultrasonic wave input/output section 32 and the second ultrasonic wave input/output section 33 (that is, the ultrasonic wave input/output section 31), which are provided continuously, are covered with the ultrasonic wave transmission membrane 38 together.

Although a mesh member through which ultrasonic waves 36 are transmitted as an example is illustrated as the ultrasonic wave transmission membrane 38, the invention is not limited to this, and it is also possible to use other members, such as a punching metal member.

End portions 28c (also see FIG. 4) of the plurality of partition plates 28 are brought into contact with the ultrasonic wave transmission membrane 38.

By bringing the ultrasonic wave transmission membrane 38 into contact with the end portions 28c of the plurality of partition plates 28, the gap between the ultrasonic wave transmission membrane 38 and the end portions 28c of the partition plates 28 can be eliminated.

Hence, there is no possibility that disturbance may be caused in a fluid at the gap between the ultrasonic wave transmission membrane 38 and the end portions 28c of the partition plates 28. This can prevent disturbance from occurring in ultrasonic waves due to disturbance of a fluid.

Figure 3:
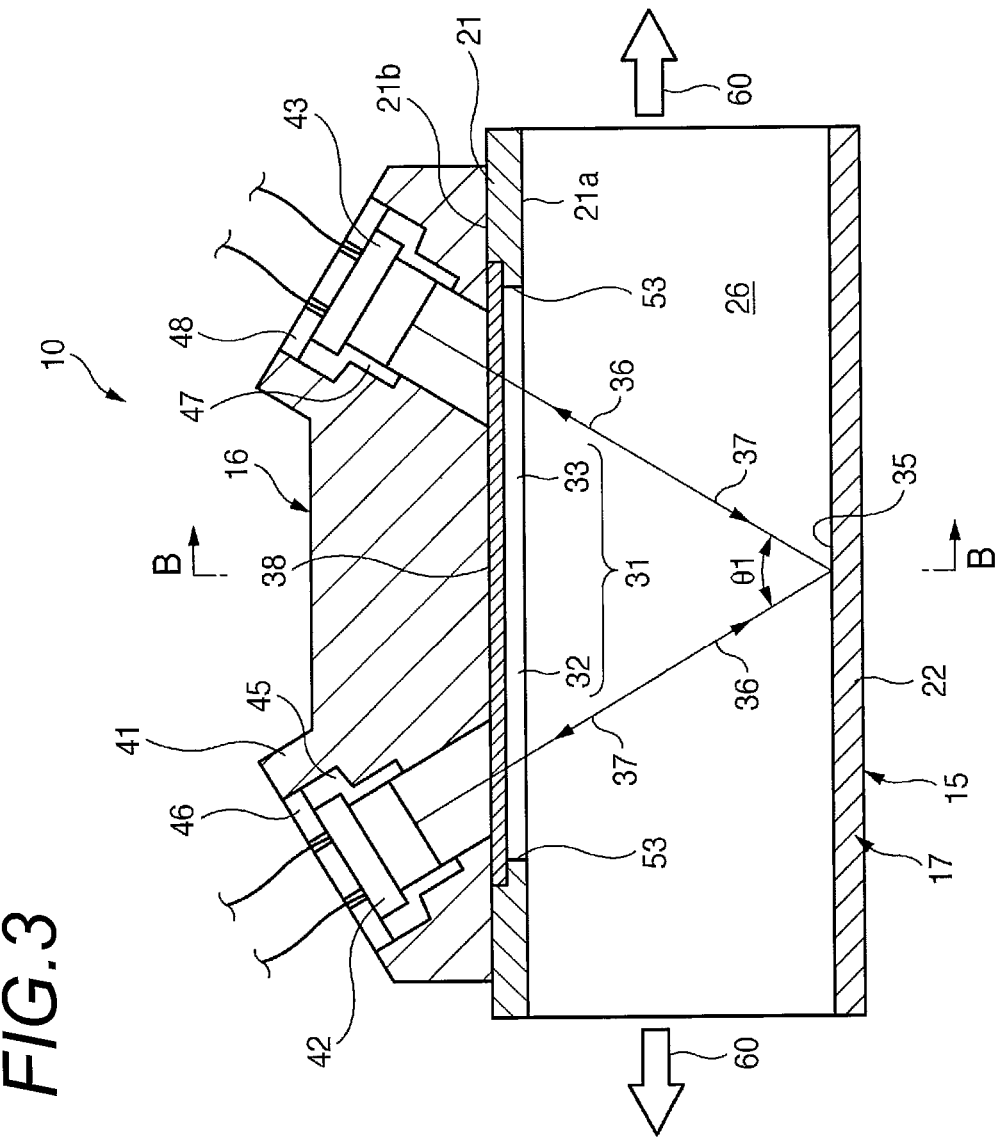
FIG. 3 is a cross-sectional view taken along a line A-A in FIG. 1.
Figure 4:
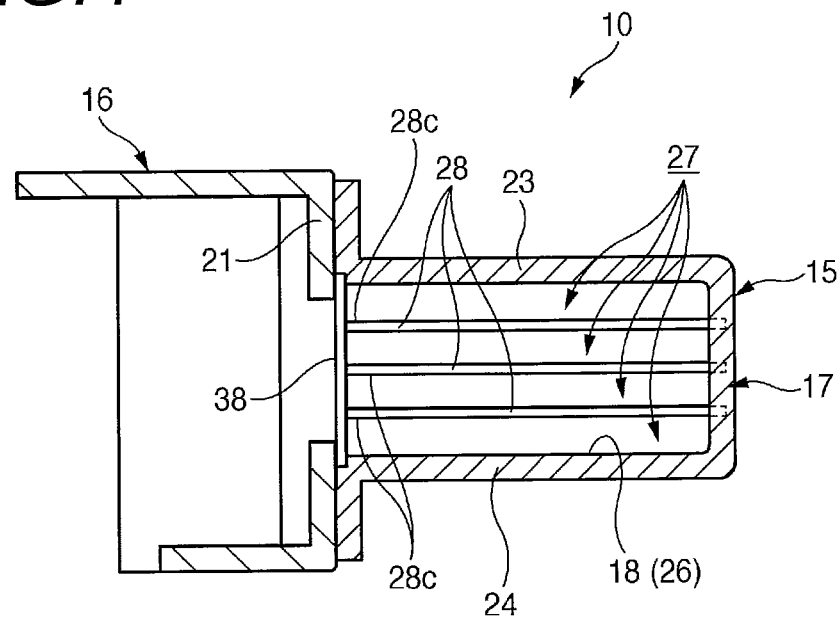
FIG. 4 is a cross-sectional view taken along a line B-B in FIG. 3.
Figure 5:
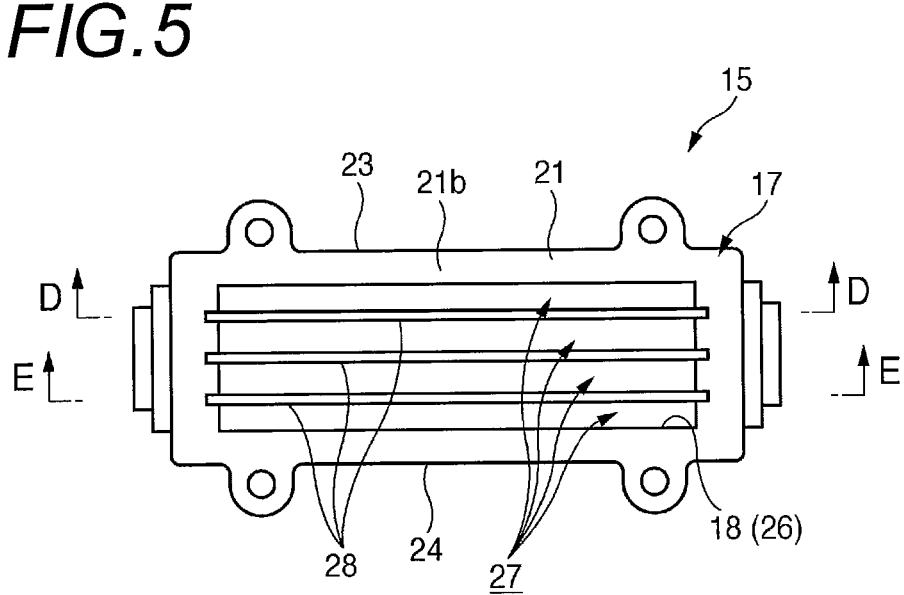
FIG. 5 is a view as seen in the direction of an arrow C in FIG. 6.

As shown in FIG. 3, the first side wall part 21 of the channel body 17 is provided with the ultrasonic measuring section 16.

The ultrasonic measuring section 16 includes a sensor block 41 provided at the first side wall part 21 of the channel body 17, a first transmitter/receiver 42 provided in an upstream region of the sensor block 41, and a second transmitter/receiver 43 provided in a downstream region of the sensor block 41.

That is, the first transmitter/receiver 42 and the second transmitter/receiver 43 are provided so as to be adjacent to each other in the first side wall part 21 of the channel body 17 via the sensor block 41.

The first transmitter/receiver 42 is attached to a predetermined attachment region by a first sensor packing 45 and a first sensor fixing member 46.

Similarly, the second transmitter/receiver 43 is attached to a predetermined attachment region by a second sensor packing 47 and a second sensor fixing member 48.

The first transmitter/receiver 42 is a transmitter/receiver that transmits the ultrasonic waves 36 to the reflecting surface 35 through the first ultrasonic wave input/output section 32 and receives the ultrasonic waves 37 reflected by the reflecting surface 35.

The second transmitter/receiver 43 is a transmitter/receiver that transmits the ultrasonic waves 37 to the reflecting surface 35 through the second ultrasonic wave input/output section 33 and receives ultrasonic waves 36 reflected by the reflecting surface 35.

Next, a configuration in which the ultrasonic wave transmission membrane 38 is attached to the first side wall part 21 of the channel body 17 will be described in detail with reference to FIG. 7.

As shown in FIG. 7, the first side wall part 21 is formed with the ultrasonic wave input/output section 31. In the ultrasonic wave input/output section 31, the first ultrasonic wave input/output section 32 and the second ultrasonic wave input/output section 33, which are adjacent to each other, are formed continuously.

By making the first ultrasonic wave input/output section 32 and the second ultrasonic wave input/output section 33 continuous with each other, a step portion (pillar portion) 51 (refer to FIG. 19) can be removed from between the first ultrasonic wave input/output section 32 and the second ultrasonic wave input/output section 33.

By removing the step portion (pillar portion) 51 from between the first ultrasonic wave input/output section 32 and the second ultrasonic wave input/output section 33, it is not necessary to provide the ultrasonic wave transmission membrane 38 on a rear surface 21a side (that is, the channel 26 side) of the first side wall part 21.

Hence, the ultrasonic wave transmission membrane 38 that covers the first ultrasonic wave input/output section 32 and the second ultrasonic wave input/output section 33 can be provided on a front surface 21b side (that is, opposite side of the channel 26) of the first side wall part 21.

That is, stepped portions 54 are formed at a peripheral wall portion 53 of the ultrasonic wave input/output section 31, and a housing recess 55 is formed on the front surface 21b side (that is, opposite side of the channel 26) of the first side wall part 21.

Then, by fitting the ultrasonic wave transmission membrane 38 into the housing recess 55, the ultrasonic wave transmission membrane 38 is attached from the front surface 21b side (that is, opposite side of the channel 26) of the first side wall part 21.

Here, by attaching the ultrasonic wave transmission membrane 38 from the front surface 21b side (that is, opposite side of the channel 26) of the first side wall part 21, the peripheral wall portion 53 of the ultrasonic wave input/output section 31 becomes a stepped portion with respect to the channel 26.

Figure 9:
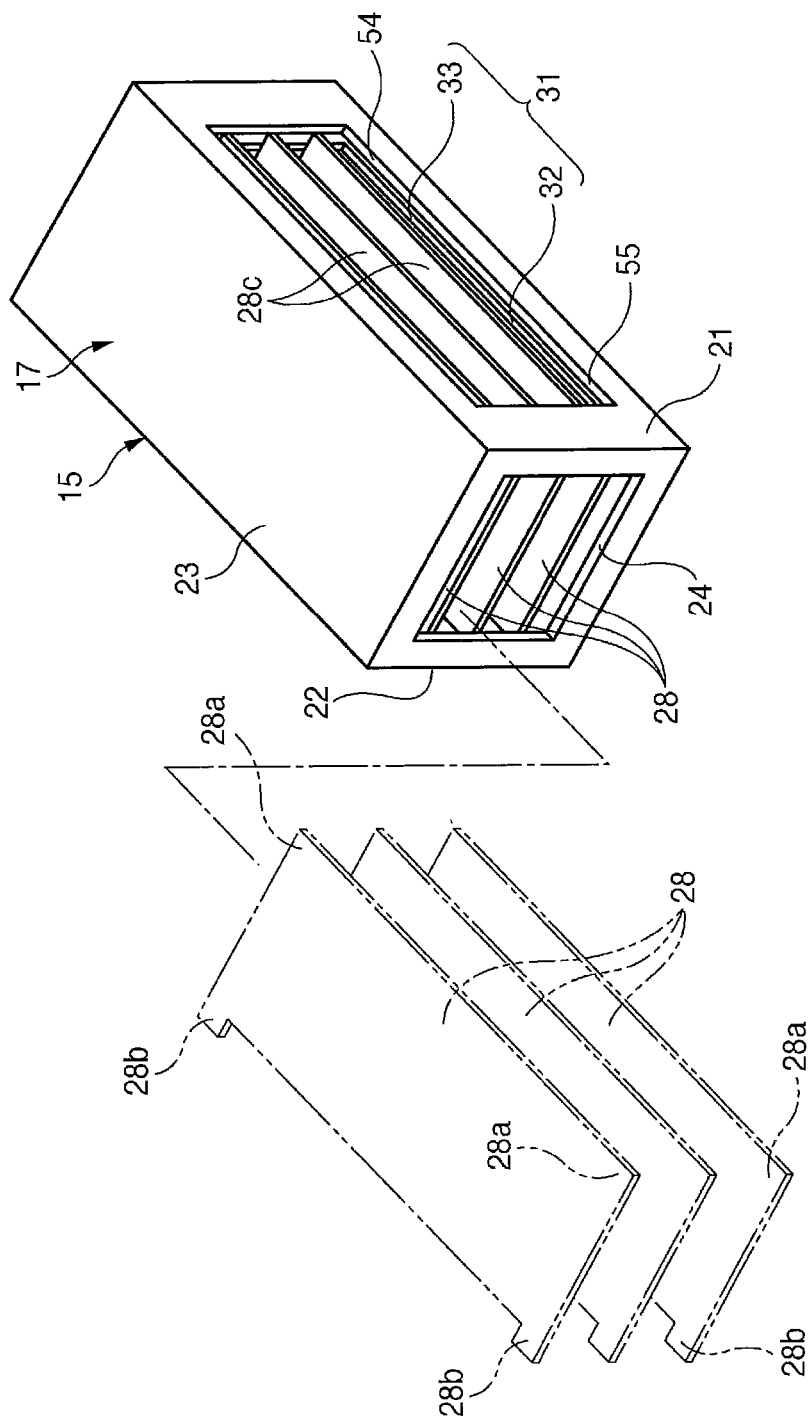
FIG. 9 is a perspective view describing the relationship between a fluid channel and partition plates according to the first embodiment.

As described above, by attaching the ultrasonic wave transmission membrane 31 from the front surface 21b side (that is, opposite side of the channel 26) of the first side wall part 21, the channel member 17 can be integrally resin-molded as shown in FIG. 9.

Figure 10:
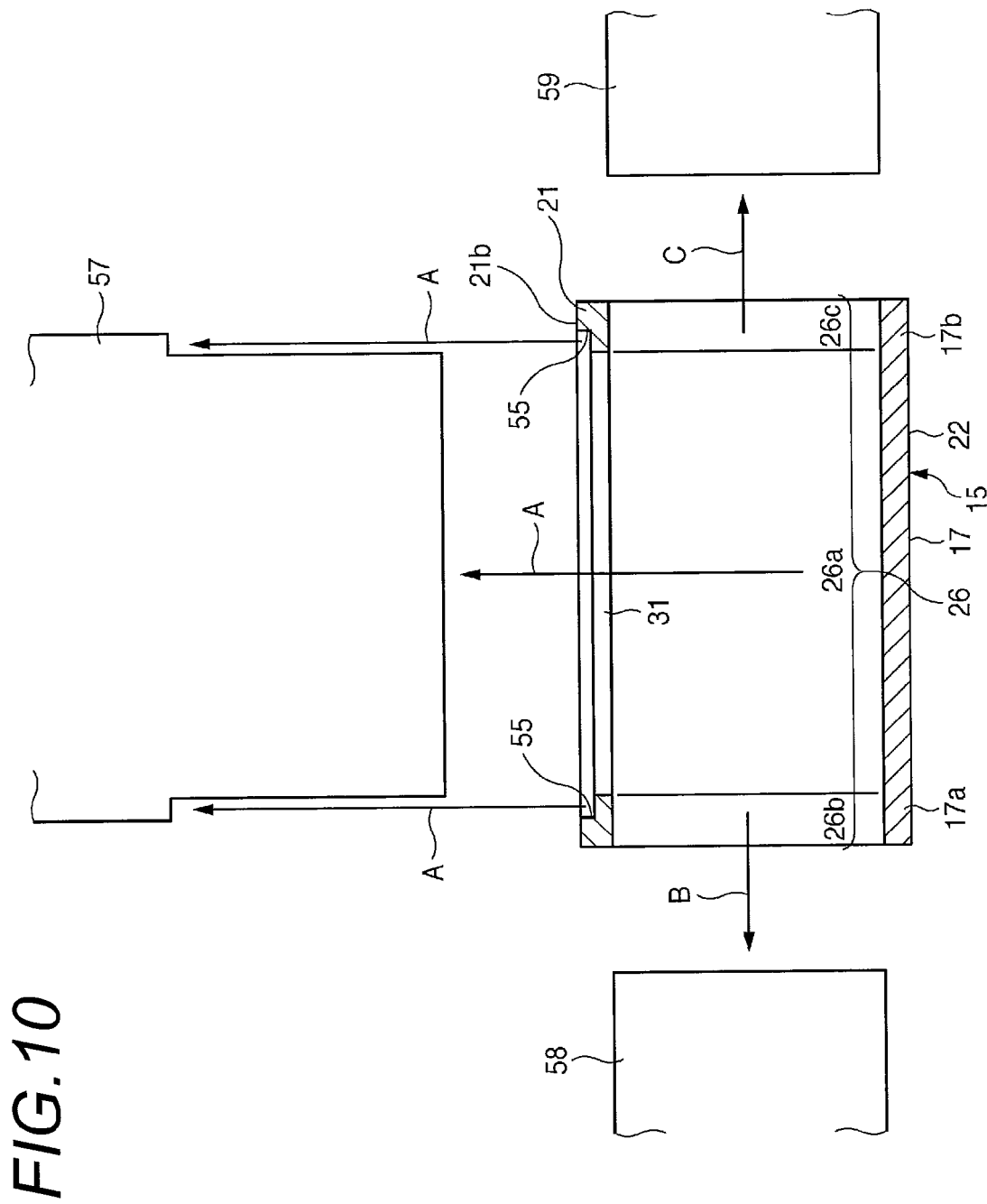
FIG. 10 is a cross-sectional view describing an example in which the fluid channel according to the first embodiment is integrally molded.

That is, as shown in FIG. 10, by extracting a mold 57 in the direction of an arrow A from the ultrasonic wave input/output section 31 of the channel member 15 (channel body 17), a central portion 26a of the channel 26 is formed, and the housing recess 55 is formed on the front surface 21b side (that is, opposite side of the channel 26) of the first side wall part 21.

Additionally, by extracting a slide mold 58 in the direction of an arrow B from one end portion 17a of the channel body 17, one end portion 26b of the channel 26 can be formed.

Moreover, by extracting the slide mold 59 in the direction of an arrow C from the other end portion 17b of the channel body 17, the other end portion 26c of the channel 26 can be formed.

Thereby, the first side wall part 21, the second side wall part 22, the top plate part 23, and the bottom plate part 24 (refer to FIG. 9), which constitute the channel body 17, are integrally resin-molded.

By integrating the first side wall part 21, the second side wall part 22, the top plate part 23, and the bottom plate part 24, the number of parts can be reduced.

Here, as shown in FIG. 9, when the channel body 17 is resin-molded, the plurality of partition plates 28 are insert-molded into the first side wall part 21 and the second side wall part 22.

By molding the plurality of partition plates 28 integrally with the first side wall part 21 and the second side wall part 22, time and effort for attaching the plurality of partition plates 28 to the first side wall part 21 and the second side wall part 22 can be saved.

Next, an example in which the flow rate of a fluid is measured by the ultrasonic fluid-measuring apparatus 10 will be described with reference to FIG. 3.

As mentioned above, the ultrasonic wave input/output section 31 is formed as the first ultrasonic wave input/output section 32 and the second ultrasonic wave input/output section 33 are provided continuously.

Both the first ultrasonic wave input/output section 32 and the second ultrasonic wave input/output section 33 (that is, the ultrasonic wave input/output section 31), which are provided continuously, are together covered with the ultrasonic wave transmission membrane 38.

Additionally, by attaching the ultrasonic wave transmission membrane 38 from the front surface 21b side (that is, opposite side of the channel 26) of the first side wall part 21, the peripheral wall portion 53 of the ultrasonic wave input/output section 31 becomes a stepped portion with respect to the channel 26 (rear surface 21a).

As the ultrasonic waves 36 transmitted from the first transmitter/receiver 42 are transmitted to the reflecting surface 35 through the first ultrasonic wave input/output section 32, and the ultrasonic waves 36 reflected in the reflecting surface 35 are received by the second transmitter/receiver 43, the ultrasonic waves 36 are transmitted in the shape of the letter V (V-path).

On the other hand, as the ultrasonic waves 37 transmitted from the second transmitter/receiver 43 are transmitted to the reflecting surface 35 through the second ultrasonic wave input/output section 33, and the ultrasonic waves 37 reflected in the reflecting surface 35 are received by the first transmitter/receiver 42, the ultrasonic waves 36 are transmitted in the shape of the letter V (V-path).

Here, by continuously providing the first ultrasonic wave input/output section 32 and the second ultrasonic wave input/output section 33 to form the ultrasonic wave input/output section 31 and together covering the ultrasonic wave input/output section 31 with the ultrasonic wave transmission membrane 38, a region (a region on the side of an included angle θ1, that is, the ultrasonic wave transmission membrane) inside the ultrasonic waves 36, which are transmitted in the shape of the letter V, can be secured flatly.

Additionally, the region inside the ultrasonic waves 37 that are transmitted in the shape of the letter V (the region on the side of the included angle θ1, i.e., the ultrasonic wave transmission membrane 38) can be secured flatly.

Hence, there is no possibility that a fluid (gas as an example) that flows through the inside (channel 26) of the channel body 17 causes disturbance in the region inside the ultrasonic waves 36 that are transmitted in the shape of the letter V, or the region inside the ultrasonic waves 37 that are transmitted in the shape of the letter V.

Additionally, as the peripheral wall portion 53 of the ultrasonic wave input/output section 31 becomes a stepped portion with respect to the channel 26 (rear surface 21a), a fluid (gas as an example) 60 that flows through the inside of the channel body 17 (channel 26) may cause disturbance at the peripheral wall portion 53 (that is, the stepped portion).

However, the peripheral wall portion 53 (that is, the stepped portion) is located outside the included angle θ1 of the ultrasonic waves 36 that are transmitted in the shape of the letter V or outside the included angle θ1 of the ultrasonic waves 37 that are transmitted in the shape of the letter V.

Hence, even if disturbance occurs in the fluid 60 in the peripheral wall portion 53 (that is, the stepped portion), there is no concern that the disturbance occurs in the ultrasonic waves 36 and the ultrasonic waves 37.

Thereby, disturbance can be prevented from occurring in the ultrasonic waves 36 and the ultrasonic waves 37 due to disturbance of the fluid 60, and the flow rate of the fluid can be precisely measured by the ultrasonic fluid-measuring apparatus 10.

Next, a second embodiment to a fifth embodiment will be described with reference to FIGS. 11 to 20.

In addition, in the second embodiment to the fifth embodiment, members that are the same as or similar to the channel member 15 of the first embodiment are designated by the same reference numerals, and the description thereof is omitted.

Second Embodiment

Figure 11:
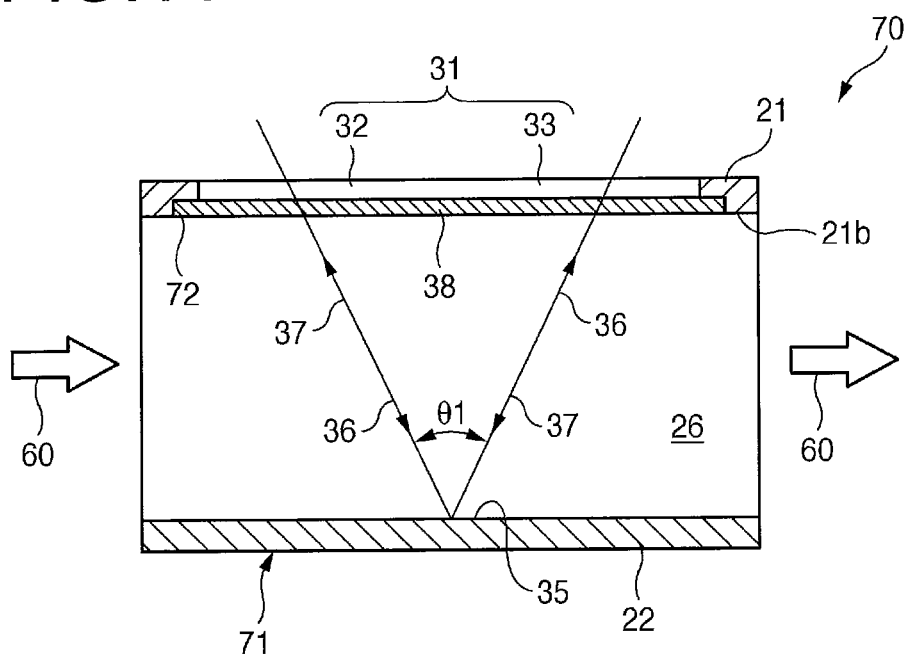
FIG. 11 is a cross-sectional view showing a fluid member according to a second embodiment of the invention.

As shown in FIG. 11, a channel member 70 according to a second embodiment of the invention has a channel body (body) 71 instead of the channel body 17.

The channel body 71 is adapted so that the ultrasonic wave transmission membrane 38 is attached from the rear surface 21a side (that is, the channel 26 side) of the first side wall part 21 by forming a housing recess 72 on the rear surface 21a side (that is, the channel 26 side) of the first side wall part 21 and fitting the ultrasonic wave transmission membrane 38 into the housing recess 72.

The first ultrasonic wave input/output section 32 and the second ultrasonic wave input/output section 33 (that is, the ultrasonic wave input/output section 31), which are provided continuously, are both covered with the ultrasonic wave transmission membrane 38 from the rear surface 21a side (that is, the channel 26 side) of the first side wall part 21.

Hence, the region (region on the side of the included angle θ1, that is, the ultrasonic wave transmission membrane 38) inside the ultrasonic waves 36 that are transmitted in the shape of the letter V, or the region (region on the side of the included angle θ1, that is, the ultrasonic wave transmission membrane 38) inside the ultrasonic waves 37 that are transmitted in the shape of the letter V can be secured flatly.

Moreover, by providing the ultrasonic wave transmission membrane 38 from the rear surface 21a side (that is, the channel 26 side) of the first side wall part 21, the ultrasonic wave transmission membrane 38 can be provided flatly with respect to the channel 26 (rear surface 21a).

Thereby, there is no possibility that the fluid 60 that flows through the inside (channel 26) of the channel body 71 causes disturbance in each region inside or outside the ultrasonic waves 36 that are transmitted in the shape of the letter V or in each region inside or outside the ultrasonic waves 37 that are transmitted in the shape of the letter V.

Accordingly, similarly to the first embodiment, disturbance can be prevented from occurring in the ultrasonic waves 36 and the ultrasonic waves 37 due to disturbance of the fluid 60, and the flow rate of a fluid can be precisely measured by the ultrasonic fluid-measuring apparatus 10.

Here, as mentioned above, in the channel member 70 (channel body 71) of the second embodiment, the housing recess 72 is formed on the rear surface 21a side (that is, the channel 26 side) of the first side wall part 21.

Hence, it is difficult to integrally resin-mold the channel body 71 unlike the channel body 17 of the first embodiment.

Figure 12:
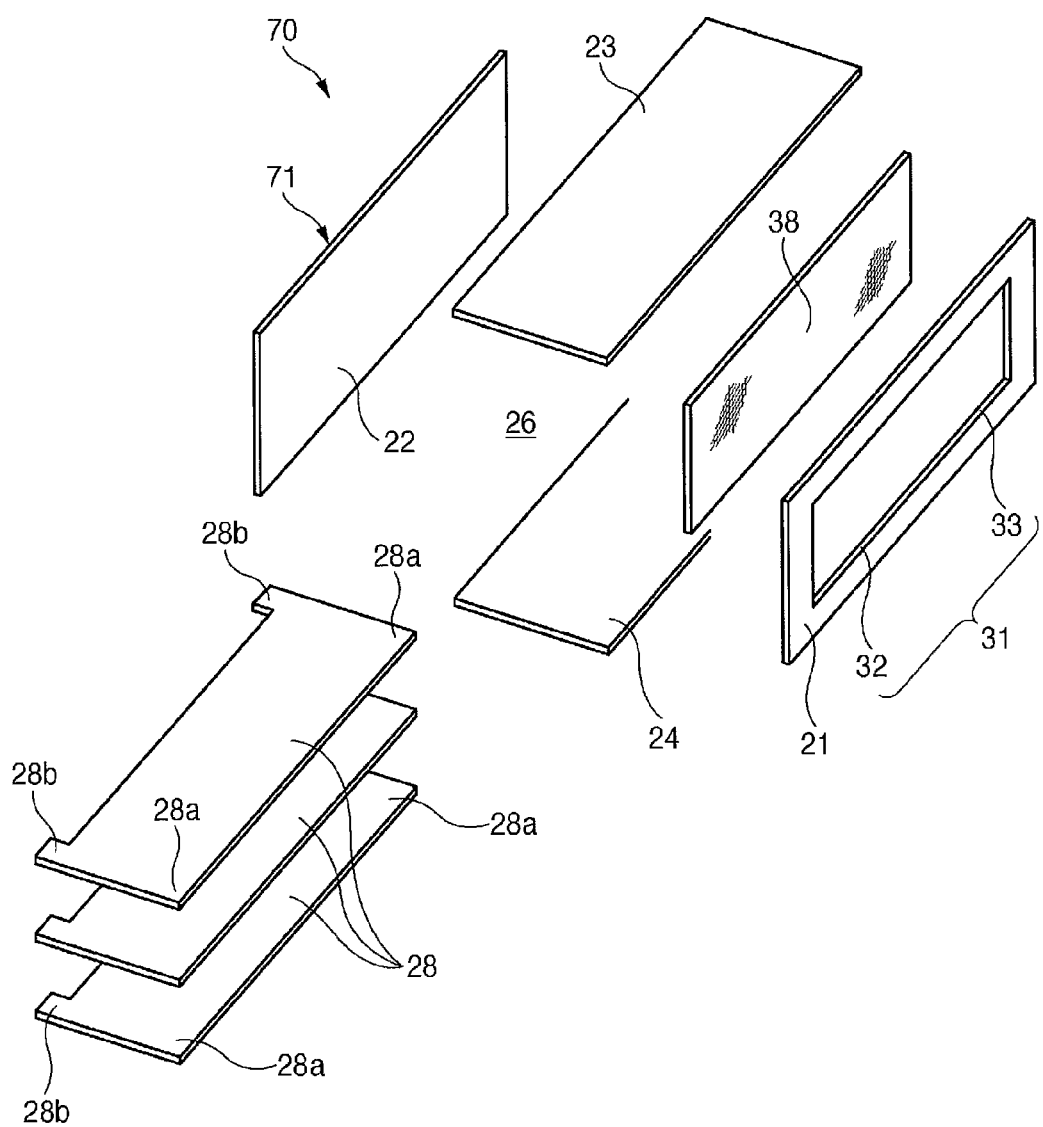
FIG. 12 is an exploded perspective view describing an example in which the fluid channel according to the second embodiment is assembled.

Thus, as shown in FIG. 12, the first side wall part 21, the second side wall part 22, the top plate part 23, and the bottom plate part 24 are constituted by individual members, respectively.

Then, when the first side wall part 21, the second side wall part 22, the top plate part 23, and the bottom plate part 24 are assembled, the ultrasonic wave transmission membrane 38 is attached to the housing recess 72 (refer to FIG. 11) from the rear surface 21a side (that is, the channel 26 side) of the first side wall part 21.

In addition, when the first side wall part 21, the second side wall part 22, the top plate part 23, and the bottom plate part 24 are assembled, the plurality of partition plates 28 (specifically, the plurality of upper corner portions 28a or the lower protruding pieces 28b of the partition plates 28) are assembled.

In this way, by constituting the first side wall part 21, the second side wall part 22, the top plate part 23, and the bottom plate part 24 from the individual members, respectively, the channel member 70 (channel body 71) of the second embodiment can be assembled.

Here, in the channel body 71, the first side wall part 21, the second side wall part 22, the top plate part 23, and the bottom plate part 24 are formed by resinous members, respectively.

Here, according to the channel member 70 of the second embodiment, the same effects as the channel member 15 of the first embodiment can be obtained.

Third Embodiment

Figure 13:
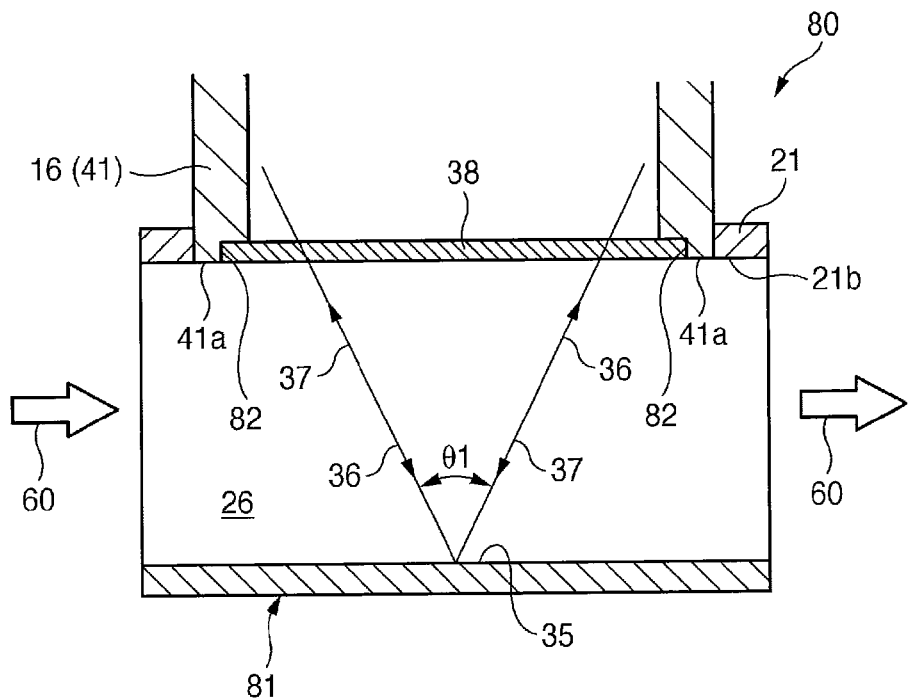
FIG. 13 is a cross-sectional view showing a state where a fluid member and an ultrasonic measuring section according to a third embodiment of the invention are assembled.
Figure 14:
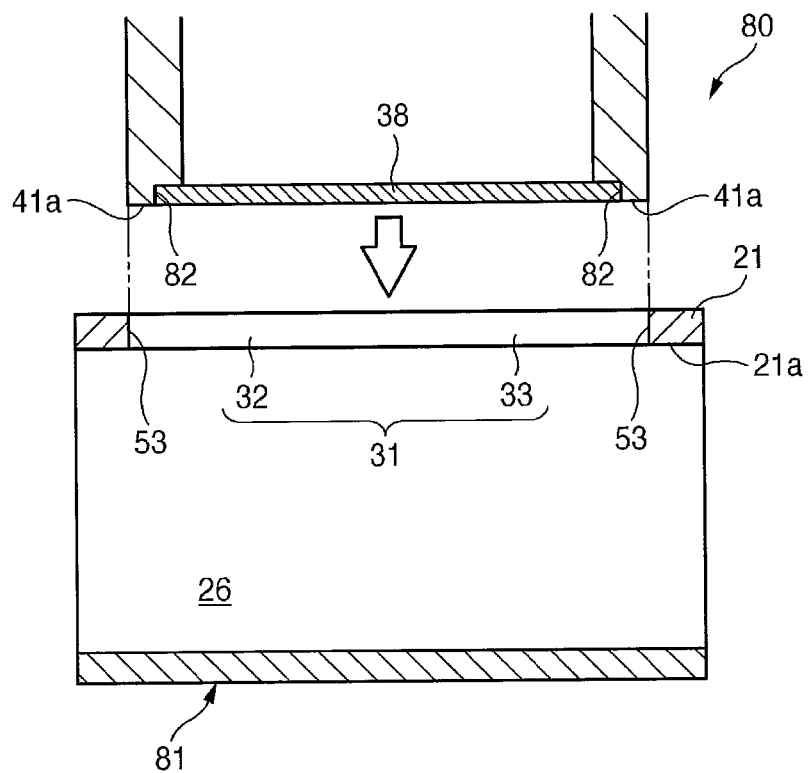
FIG. 14 is a cross-sectional view showing a state where the fluid member and the ultrasonic measuring section in FIG. 13 are disassembled.

As shown in FIGS. 13 and 14, a channel member 80 according to a third embodiment of the invention has a channel body (body) 81 instead of the channel body 17.

In the channel body 81, the ultrasonic wave input/output section 31 (the first ultrasonic wave input/output section 32 and the second ultrasonic wave input/output section 33) is formed so that the sensor block 41 of the ultrasonic measuring section 16 can be fitted thereinto.

The sensor block 41 of the ultrasonic measuring section 16 is formed with a housing recess 82, and the ultrasonic wave transmission membrane 38 is fitted into the housing recess 82. Hence, by fitting the sensor block 41 into the ultrasonic wave input/output section 31, the ultrasonic wave input/output section 31 is covered with the ultrasonic wave transmission membrane 38.

The first ultrasonic wave input/output section 32 and the second ultrasonic wave input/output section 33 (that is, the ultrasonic wave input/output section 31), which are provided continuously, are both covered with the ultrasonic wave transmission membrane 38.

Hence, the region (region on the side of the included angle θ1, that is, the ultrasonic wave transmission membrane 38) inside the ultrasonic waves 36 that are transmitted in the shape of the letter V, or the region (region on the side of the included angle θ1, that is, the ultrasonic wave transmission membrane 38) inside the ultrasonic waves 37 that are transmitted in the shape of the letter V can be secured flatly.

Moreover, by fitting the ultrasonic wave transmission membrane 38 into the housing recess 82 of the sensor block 41, the ultrasonic wave transmission membrane 38 can be arranged flatly with respect to a bottom surface 41a of the sensor block 41.

In addition, by fitting the sensor block 41 into the ultrasonic wave input/output section 31 (the first ultrasonic wave input/output section 32 and the second ultrasonic wave input/output section 33), the bottom surface 41a of the sensor block 41 and the ultrasonic wave transmission membrane 38 can be provided flatly with respect to the channel 26 (rear surface 21a).

Thereby, there is no possibility that the fluid 60 that flows through the inside (channel 26) of the channel body 81 causes disturbance in each region inside or outside the ultrasonic waves 36 that are transmitted in the shape of the letter V or in each region inside or outside the ultrasonic waves 37 that are transmitted in the shape of the letter V.

Accordingly, similarly to the first embodiment, disturbance can be prevented from occurring in the ultrasonic waves 36 and the ultrasonic waves 37 due to disturbance of a fluid 60, and the flow rate of the fluid 60 can be precisely measured by the ultrasonic fluid-measuring apparatus 10.

Here, in the channel member 80 (channel body 81) of the third embodiment, the peripheral wall portion 53 of the ultrasonic wave input/output section 31 is formed flatly.

Hence, the channel body 81 can be integrally resin-molded similarly to the channel body 17 of the first embodiment.

Figure 15:
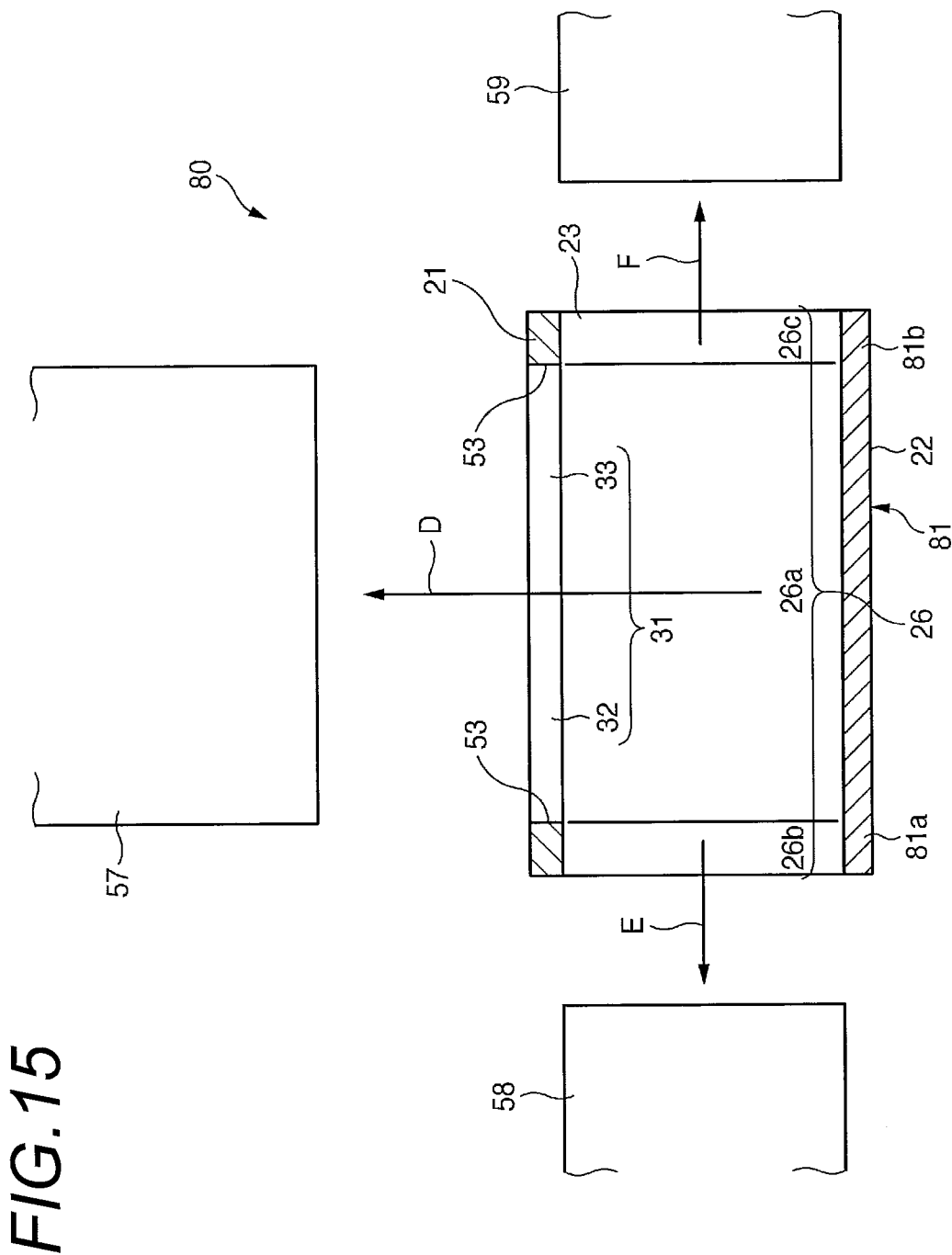
FIG. 15 is a cross-sectional view describing an example in which the fluid channel according to the third embodiment is integrally molded.

That is, as shown in FIG. 15, by extracting the mold 57 in the direction of an arrow D from the ultrasonic wave input/output section 31 of the channel body 81, the central portion 26a of the channel 26 is formed, and the first side wall part 21 is formed with the ultrasonic wave input/output section 31.

Additionally, by extracting the slide mold 58 in the direction of an arrow E from one end portion 81a of the channel body 81, one end portion 26b of the channel 26 can be formed.

Moreover, by extracting the slide mold 59 in the direction of an arrow F from the other end portion 81b of the channel body 81, the other end portion 26c of the channel 26 can be formed.

Thereby, the first side wall part 21, the second side wall part 22, the top plate part 23, and the bottom plate part 24 (refer to FIG. 9), which constitute the channel body 81, are integrally resin-molded, similarly to the first embodiment.

By integrating the first side wall part 21, the second side wall part 22, the top plate part 23, and the bottom plate part 24, the number of parts can be reduced.

Here, when the channel body 81 is resin-molded, similarly to the first embodiment, the plurality of partition plates 28 (refer to FIG. 9) are insert-molded into the first side wall part 21 and the second side wall part 22.

By molding the plurality of partition plates 28 integrally with the first side wall part 21 and the second side wall part 22, time and effort for attaching the plurality of partition plates 28 to the first side wall part 21 and the second side wall part 22 can be saved.

Here, according to the channel member 80 of the third embodiment, the same effects as the channel member 15 of the first embodiment can be obtained.

Fourth Embodiment

Figure 16:
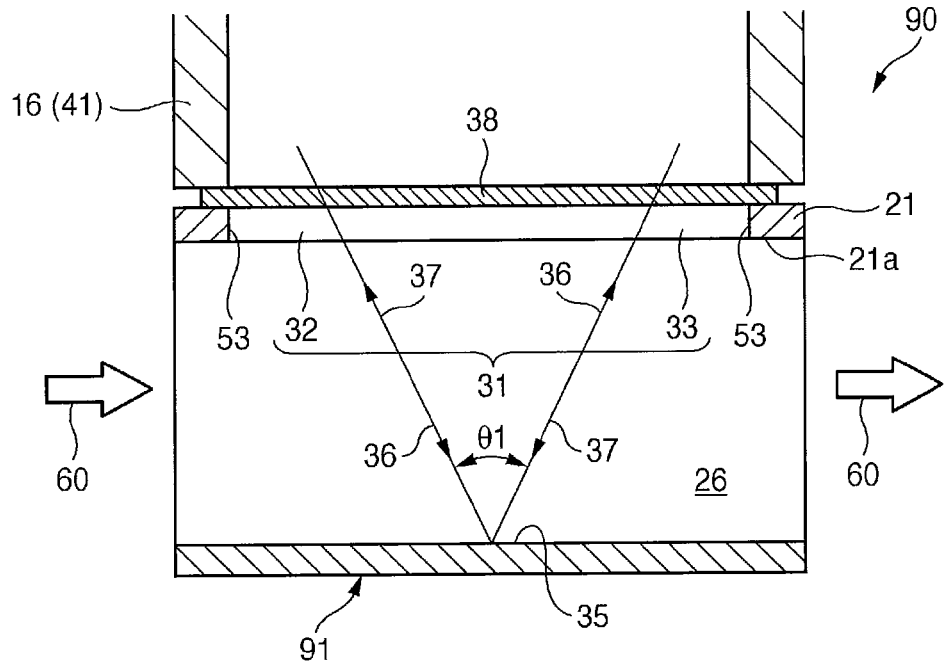
FIG. 16 is a cross-sectional view showing a state where a fluid member and an ultrasonic measuring section according to a fourth embodiment of the invention are assembled.
Figure 17:
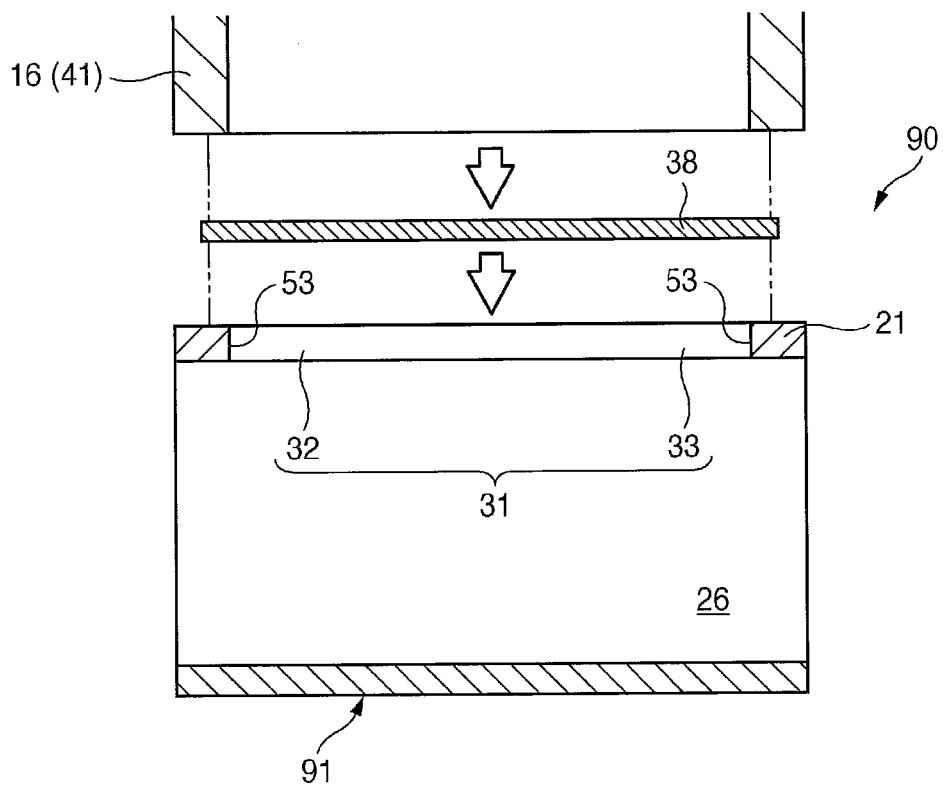
FIG. 17 is a cross-sectional view showing a state where the fluid member and the ultrasonic measuring section in FIG. 16 are disassembled.

As shown in FIGS. 16 and 17, a channel member 90 according to a fourth embodiment of the invention has a channel body (body) 91 instead of the channel body 17.

In the channel body 91, the first side wall part 21 is formed so as to be able to sandwich the ultrasonic wave transmission membrane 38 between the first side wall part 21 and the sensor block 41.

That is, by sandwiching the ultrasonic wave transmission membrane 38 between the first side wall part 21 of the channel body 91 and the sensor block 41, the ultrasonic wave input/output section 31 is covered with the ultrasonic wave transmission membrane 38.

The first ultrasonic wave input/output section 32 and the second ultrasonic wave input/output section 33 (that is, the ultrasonic wave input/output section 31), which are provided continuously, are both covered with the ultrasonic wave transmission membrane 38.

Hence, the region (region on the side of the included angle θ1, that is, the ultrasonic wave transmission membrane 38) inside the ultrasonic waves 36 that are transmitted in the shape of the letter V, or the region (region on the side of the included angle θ1, that is, the ultrasonic wave transmission membrane 38) inside the ultrasonic waves 37 that are transmitted in the shape of the letter V can be secured flatly.

Here, by sandwiching the ultrasonic wave transmission membrane 38 between the first side wall part 21 and the sensor block 41, the peripheral wall portion 53 of the ultrasonic wave input/output section 31 becomes a stepped portion with respect to the channel 26 (rear surface 21a).

Hence, the fluid 60 that flows through the inside of the channel body 91 (channel 26) may cause disturbance at the peripheral wall portion 53 (that is, the stepped portion).

However, the peripheral wall portion 53 (that is, the stepped portion) is located outside the ultrasonic waves 36 that are transmitted in the shape of the letter V or outside the ultrasonic waves 37 that are transmitted in the shape of the letter V.

Hence, even if disturbance occurs in the fluid 60 in the peripheral wall portion 53 (that is, the stepped portion), there is no concern that disturbance may occur in the ultrasonic waves 36.

Thereby, there is no possibility that the fluid 60 that flows through the inside (channel 26) of the channel body 91 causes disturbance in each region inside or outside the ultrasonic waves 36 that are transmitted in the shape of the letter V, and each region inside or outside the ultrasonic waves 37 that are transmitted in the shape of the letter V.

Accordingly, similarly to the first embodiment, disturbance can be prevented from occurring in the ultrasonic waves 36 and the ultrasonic waves 37 due to disturbance of the fluid 60, and the flow rate of a fluid can be precisely measured by the ultrasonic fluid-measuring apparatus 10.

Here, in the channel member 90 (channel body 91) of the fourth embodiment, the peripheral wall portion 53 of the ultrasonic wave input/output section 31 is formed flatly.

Hence, the channel body 91 can be integrally resin-molded similarly to the channel body 17 of the first embodiment.

Figure 18:
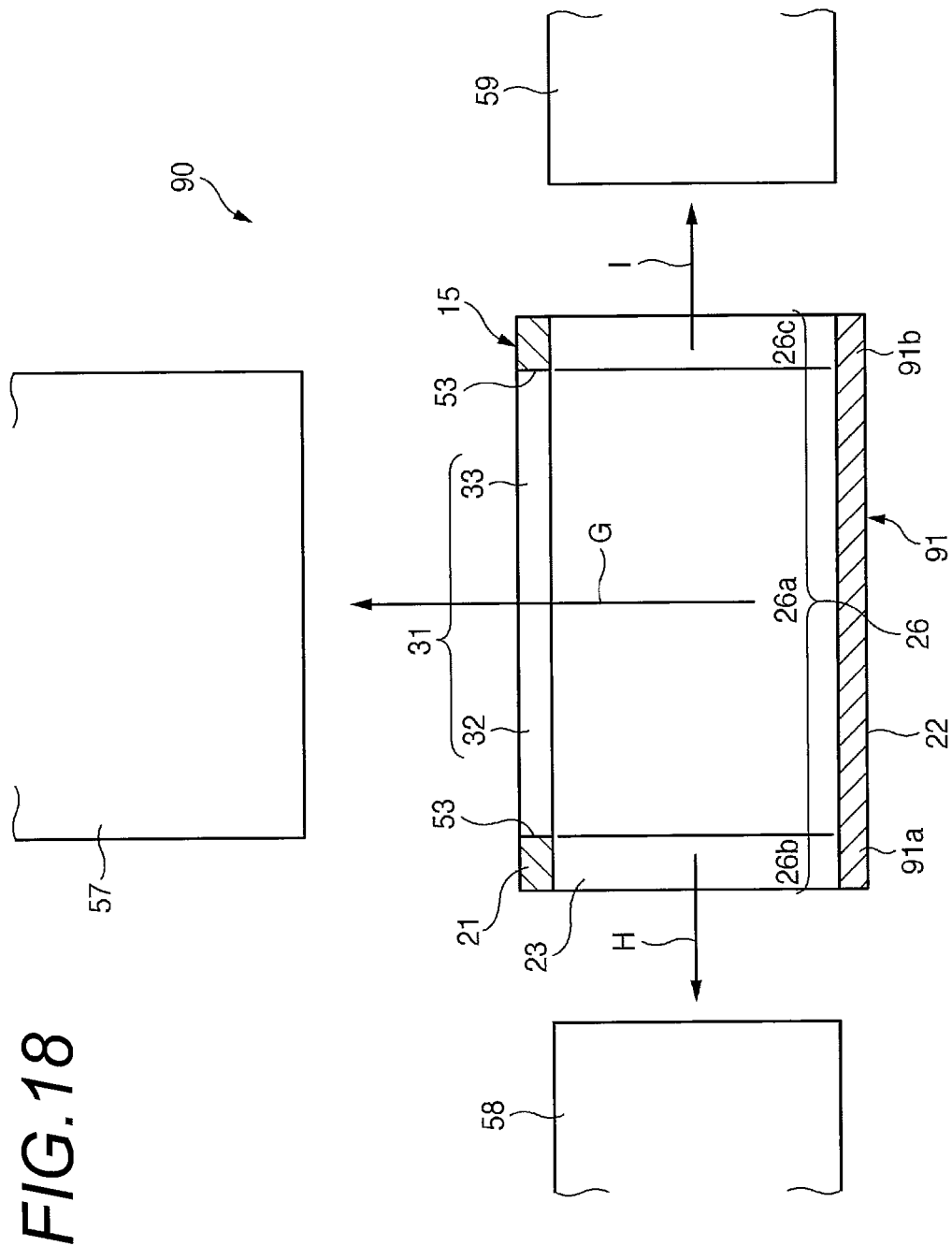
FIG. 18 is a cross-sectional view describing an example in which the fluid channel according to the fourth embodiment is integrally molded.

That is, as shown in FIG. 18, by extracting the mold 57 in the direction of an arrow G from the ultrasonic wave input/output section 31 of the channel body 91, the central portion 26a of the channel 26 is formed, and the first side wall part 21 is formed with the ultrasonic wave input/output section 31.

Additionally, by extracting the slide mold 58 in the direction of an arrow H from one end portion 91a of the channel body 91, one end portion 26b of the channel 26 can be formed.

Moreover, by extracting the slide mold 59 in the direction of an arrow I from the other end portion 91b of the channel body 91, the other end portion 26c of the channel 26 can be formed.

Thereby, the first side wall part 21, the second side wall part 22, the top plate part 23, and the bottom plate part 24 (refer to FIG. 9), which constitute the channel body 91, are integrally resin-molded, similarly to the first embodiment.

By integrating the first side wall part 21, the second side wall part 22, the top plate part 23, and the bottom plate part 24, the number of parts can be reduced.

Here, when the channel body 91 is resin-molded, similarly to the first embodiment, the plurality of partition plates 28 (refer to FIG. 9) are insert-molded into the first side wall part 21 and the second side wall part 22.

By molding the plurality of partition plates 28 integrally with the first side wall part 21 and the second side wall part 22, time and effort for attaching the plurality of partition plates 28 to the first side wall part 21 and the second side wall part 22 can be saved.

Here, according to the channel member 90 of the fourth embodiment, the same effects as the channel member 15 of the first embodiment can be obtained.

Fifth Embodiment

Figure 19:
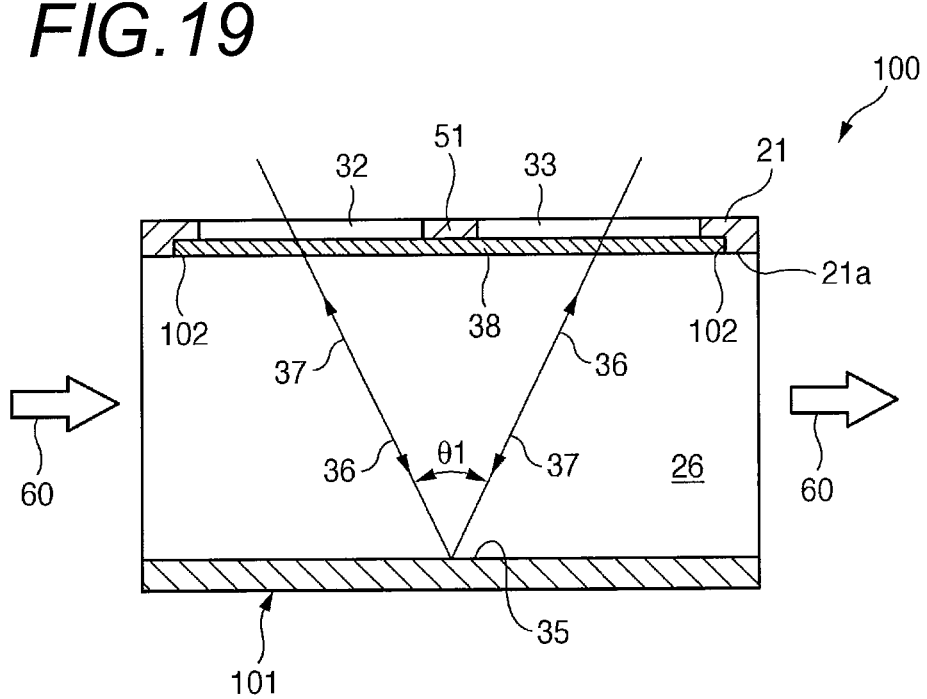
FIG. 19 is a cross-sectional view showing a fluid member according to a fifth embodiment of the invention.

As shown in FIG. 19, a channel member 100 according to a fifth embodiment of the invention has a channel body (body) 101 instead of the channel body 17.

The channel body 101 is adapted so that the ultrasonic wave transmission membrane 38 is attached from the rear surface 21a side (that is, the channel 26 side) of the first side wall part 21 by provided the first ultrasonic wave input/output section 32 and the second ultrasonic wave input/output section 33 so as to be adjacent to each other in the first side wall part 21, forming a housing recess 102 on the rear surface 21a side (that is, the channel 26 side) of the first side wall part 21, and fitting the ultrasonic wave transmission membrane 38 into the housing recess 102.

By providing the first ultrasonic wave input/output section 32 and the second ultrasonic wave input/output section 33 so as to be adjacent to each other, the stepped portion (pillar portion) 51 is formed between the first ultrasonic wave input/output section 32 and the second ultrasonic wave input/output section 33.

Here, the first ultrasonic wave input/output section 32 and the second ultrasonic wave input/output section 33, which are provided so as to be adjacent to each other, are both covered with the ultrasonic wave transmission membrane 38 from the rear surface 21a side (that is, the channel 26 side) of the first side wall part 21.

Hence, the stepped portion (pillar portion) 51 can be covered with the ultrasonic wave transmission membrane 38.

Thereby, the region (region on the side of the included angle θ1, that is, the ultrasonic wave transmission membrane 38) inside the ultrasonic waves 36 that are transmitted in the shape of the letter V, or the region (region on the side of the included angle θ1, that is, the ultrasonic wave transmission membrane 38) inside the ultrasonic waves 37 that are transmitted in the shape of the letter V can be secured flatly.

Moreover, by providing the ultrasonic wave transmission membrane 38 from the rear surface 21a side (that is, the channel 26 side) of the first side wall part 21, the ultrasonic wave transmission membrane 38 can be provided flatly with respect to the channel 26 (rear surface 21a).

Thereby, there is no possibility that the fluid 60 that flows through the inside (channel 26) of the channel body 101 causes disturbance in each region inside or outside the ultrasonic waves 36 that are transmitted in the shape of the letter V or in each region inside or outside the ultrasonic waves 37 that are transmitted in the shape of the letter V.

Accordingly, similarly to the first embodiment, disturbance can be prevented from occurring in the ultrasonic waves 36 and the ultrasonic waves 37 due to disturbance of the fluid 60, and the flow rate of a fluid can be precisely measured by the ultrasonic fluid-measuring apparatus 10.

Here, in the channel member 100 (channel body 101) of the fifth embodiment, the housing recess 102 is formed on the rear surface 21a side (that is, the channel 26 side) of the first side wall part 21.

Hence, it is difficult to integrally resin-mold the channel body 101 unlike the channel body 17 of the first embodiment.

Figure 20:
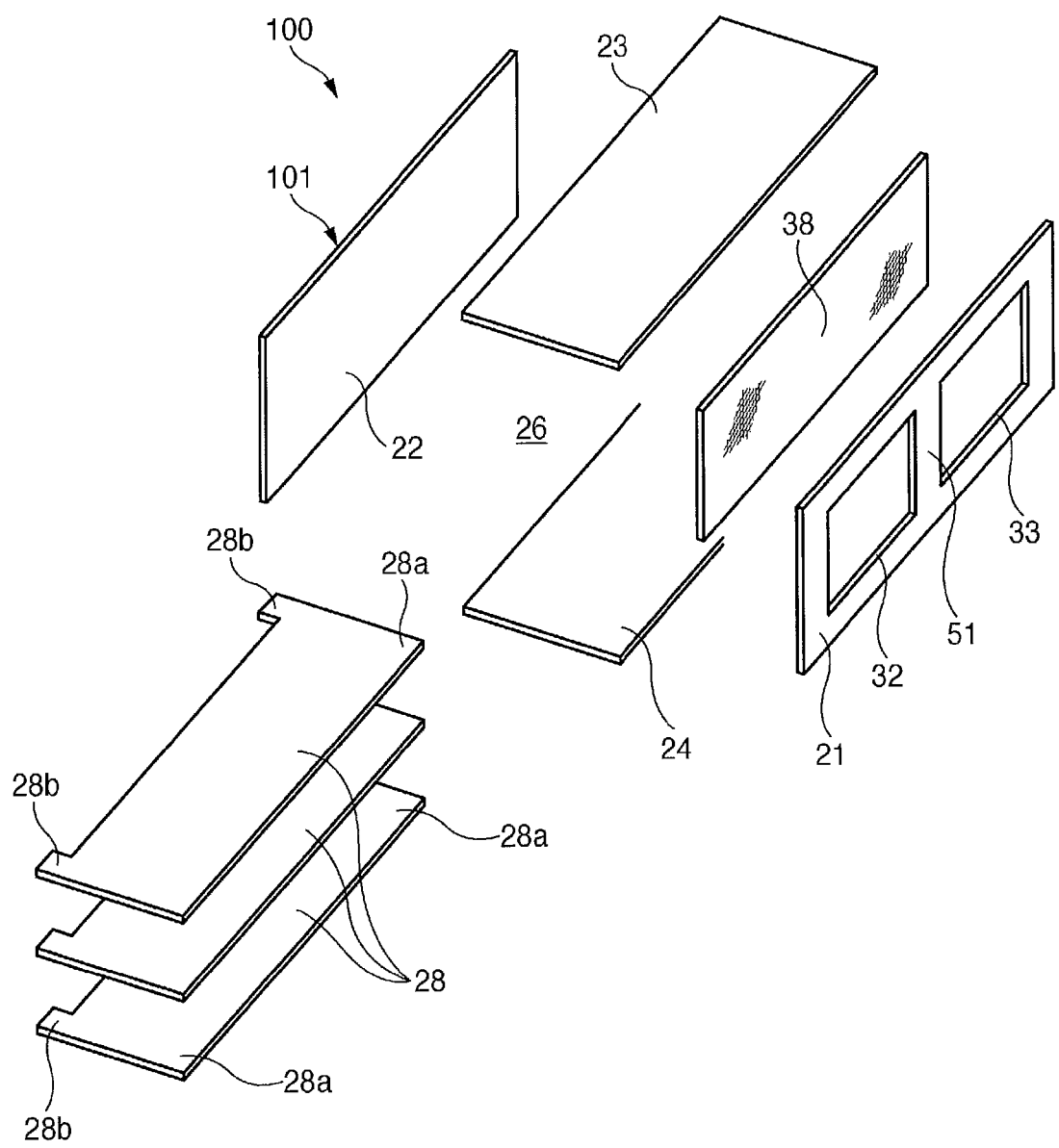
FIG. 20 is an exploded perspective view describing an example in which the fluid channel according to the fifth embodiment is assembled.

Thus, as shown in FIG. 20, the first side wall part 21, the second side wall part 22, the top plate part 23, and the bottom plate part 24 are constituted by individual members, respectively.

Then, when the first side wall part 21, the second side wall part 22, the top plate part 23, and the bottom plate part 24 are assembled, the ultrasonic wave transmission membrane 38 is attached to the housing recess 102 (refer to FIG. 19) from the rear surface 21a side (that is, the channel 26 side) of the first side wall part 21.

In addition, when the first side wall part 21, the second side wall part 22, the top plate part 23, and the bottom plate part 24 are assembled, the plurality of partition plates 28 are assembled.

In this way, by constituting the first side wall part 21, the second side wall part 22, the top plate part 23, and the bottom plate part 24 from the individual members, respectively, the channel member 100 (channel body 101) of the fifth embodiment can be assembled.

Here, in the channel body 101, the first side wall part 21, the second side wall part 22, the top plate part 23, and the bottom plate part 24 are formed by resinous members, respectively.

Here, according to the channel member 100 of the third embodiment, the same effects as the channel member 15 of the fifth embodiment can be obtained.

Sixth Embodiment

Figure 21:
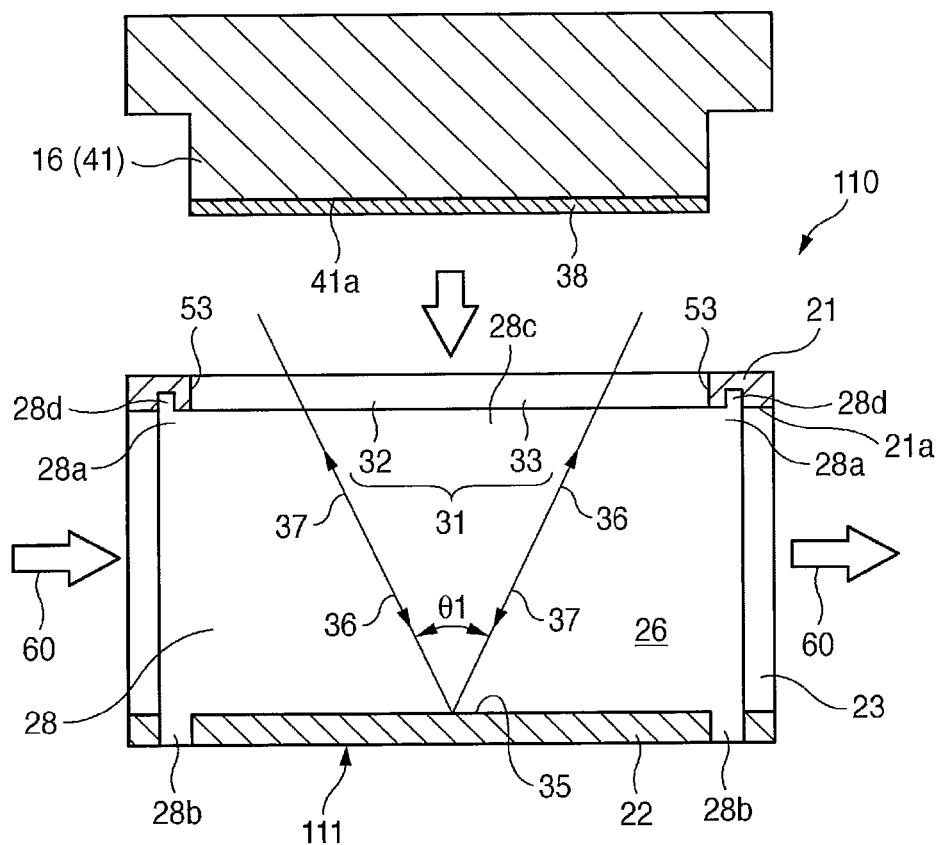
FIG. 21 is a cross-sectional view showing a fluid member according to a sixth embodiment of the invention.

As shown in FIG. 21, a channel member 110 according to a sixth embodiment of the invention has a channel body (body) 111 instead of the channel body 17.

In the channel body 111, similarly to the third embodiment show in FIGS. 13 and 14, the ultrasonic wave input/output section 31 (the first ultrasonic wave input/output section 32 and the second ultrasonic wave input/output section 33) is formed so that the sensor block 41 of the ultrasonic measuring section 16 can be fitted thereinto.

The bottom surface 41a of the sensor block 41 is provided with the ultrasonic wave transmission membrane 38. Hence, by fitting the sensor block 41 into the ultrasonic wave input/output section 31, the ultrasonic wave input/output section 31 is covered with the ultrasonic wave transmission membrane 38.

That is, the first ultrasonic wave input/output section 32 and the second ultrasonic wave input/output section 33 (that is, the ultrasonic wave input/output section 31), which are provided continuously, are both covered with the ultrasonic wave transmission membrane 38.

Hence, the region (region on the side of the included angle θ1, that is, the ultrasonic wave transmission membrane 38) inside the ultrasonic waves 36 that are transmitted in the shape of the letter V, or the region (region on the side of the included angle θ1, that is, the ultrasonic wave transmission membrane 38) inside the ultrasonic waves 37 that are transmitted in the shape of the letter V can be secured flatly.

In addition, the ultrasonic wave transmission membrane 38 can be provided flatly with respect to the channel 26 (rear surface 21a) in a state where the sensor block 41 is fitted into the ultrasonic wave input/output section 31.

Thereby, there is no possibility that the fluid 60 that flows through the inside (channel 26) of the channel body 111 causes disturbance in each region inside or outside the ultrasonic waves 36 that are transmitted in the shape of the letter V or in each region inside or outside the ultrasonic waves 37 that are transmitted in the shape of the letter V.

Accordingly, similarly to the first embodiment, disturbance can be prevented from occurring in the ultrasonic waves 36 and the ultrasonic waves 37 due to disturbance of a fluid 60, and the flow rate of the fluid 60 can be precisely measured by the ultrasonic fluid-measuring apparatus 10.

Here, in the channel member 110 (channel body 111) of the third embodiment, the peripheral wall portion 53 of the ultrasonic wave input/output section 31 is formed flatly.

Hence, the channel body 81 can be integrally resin-molded similarly to the channel body 17 of the first embodiment or the channel body 81 of the third embodiment.

That is, the first side wall part 21, the second side wall part 22, the top plate part 23, and the bottom plate part 24 (not shown), which constitute the channel body 111, are integrally resin-molded, similarly to the first embodiment or the third embodiment.

By integrating the first side wall part 21, the second side wall part 22, the top plate part 23, and the bottom plate part 24, the number of parts can be reduced.

Here, when the channel body 111 is resin-molded, similarly to the first embodiment or a third embodiment, the plurality of partition plates 28 (refer to FIG. 9) are insert-molded into the first side wall part 21 and the second side wall part 22.

In the partition plate 28, upper protruding portions 28d protruded from the upper corner portions 28a, and the lower protruding pieces 28b protrude from the lower corner portions.

Integral molding (insert molding) is performed in a state where the upper corner portions 28a of the plurality of partition plates 28 are molded integrally (insert-molded) and the lower protruding pieces 28b of the plurality of partition plates 28 are passed through the second side wall part 22.

By allowing insert molding in a state where the lower protruding pieces 28b are passed through the second side wall part 22, when the partition plates 28 are insert-molded, the lower protruding pieces 28b can be held by the mold, and the partition plates 28 can be easily positioned at predetermined positions.

In addition, by molding the plurality of partition plates 28 integrally with the first side wall part 21 and the second side wall part 22, time and effort for attaching the plurality of partition plates 28 to the first side wall part 21 and the second side wall part 22 can be saved.

In the channel member 110 of the sixth embodiment, similarly to the first embodiment, the end portions 28c of the plurality of partition plates 28 are brought into contact with the ultrasonic wave transmission membrane 38 in a state where the sensor block 41 is fitted into the ultrasonic wave input/output section 31.

By bringing the ultrasonic wave transmission membrane 38 into contact with the end portions 28c of the plurality of partition plates 28, the gap between the ultrasonic wave transmission membrane 38 and the end portions 28c of the partition plates 28 can be eliminated.

Hence, there is no possibility that disturbance may be caused in a fluid at the gap between the ultrasonic wave transmission membrane 38 and the end portions 28c of the partition plates 28. This can prevent disturbance from occurring in ultrasonic waves due to disturbance of a fluid.

Here, according to the channel member 110 of the sixth embodiment, the same effects as the channel member 15 of the first embodiment can be obtained.

Seventh Embodiment

Figure 22:
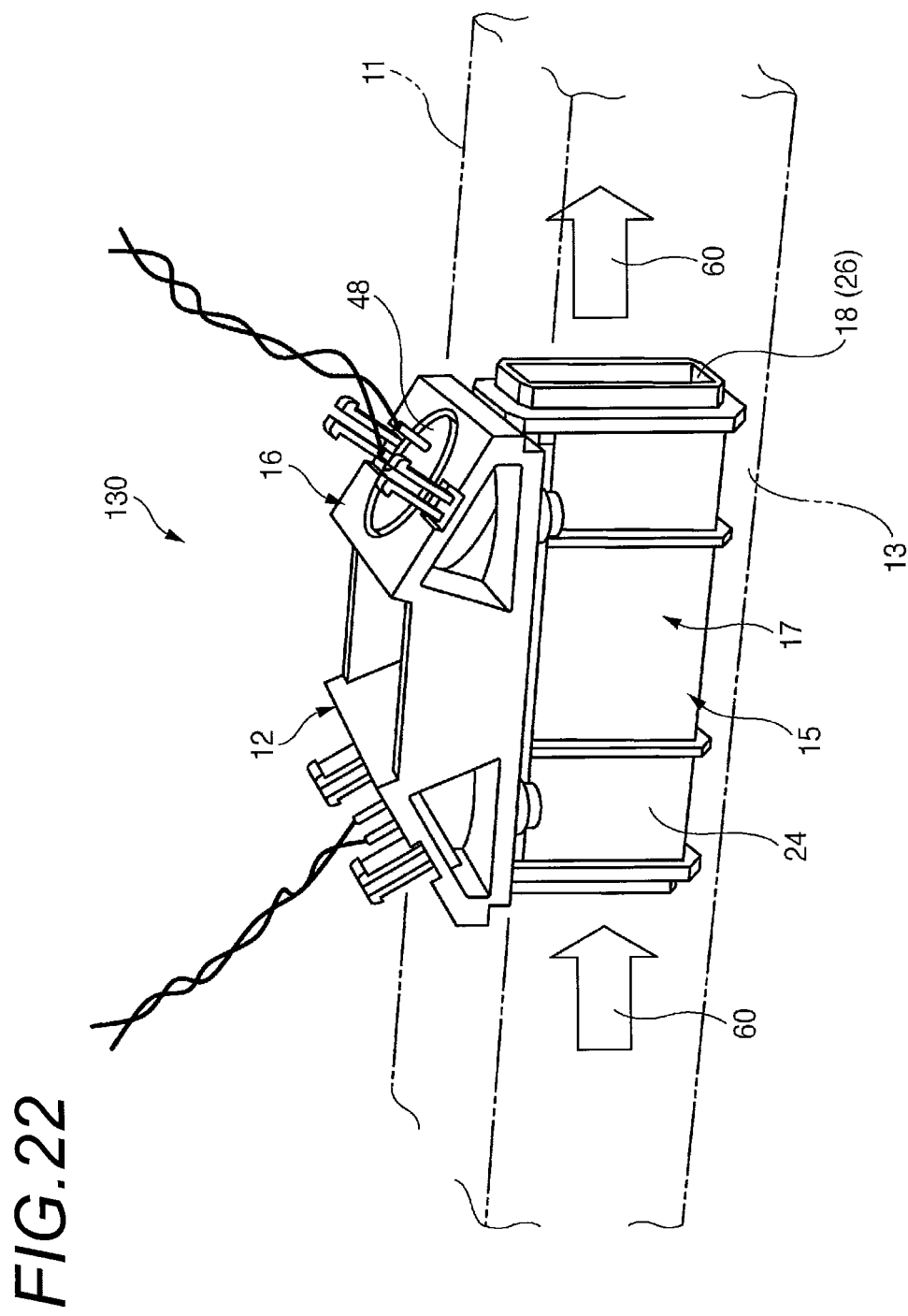
FIG. 22 is a perspective view showing an ultrasonic fluid-measuring apparatus according to a seventh embodiment of the invention.

A channel member 130 according to a seventh embodiment of the invention shown in FIG. 22 basically has the same ultrasonic fluid-measuring structure 12 as the first embodiment.

The ultrasonic fluid-measuring structure 12 is accommodated in an accommodating section 13 of a measuring channel 11 that guides fluids, such as gas, to a fluid consumption device (not shown). The ultrasonic fluid-measuring structure 12 includes the channel member 15 accommodated in the accommodating section 13, and an ultrasonic measuring section 16 adjacent to the channel member 15.

Even in such a seventh embodiment, the same effects as the first embodiment mentioned above are obtained.

Eighth Embodiment

Figure 23:
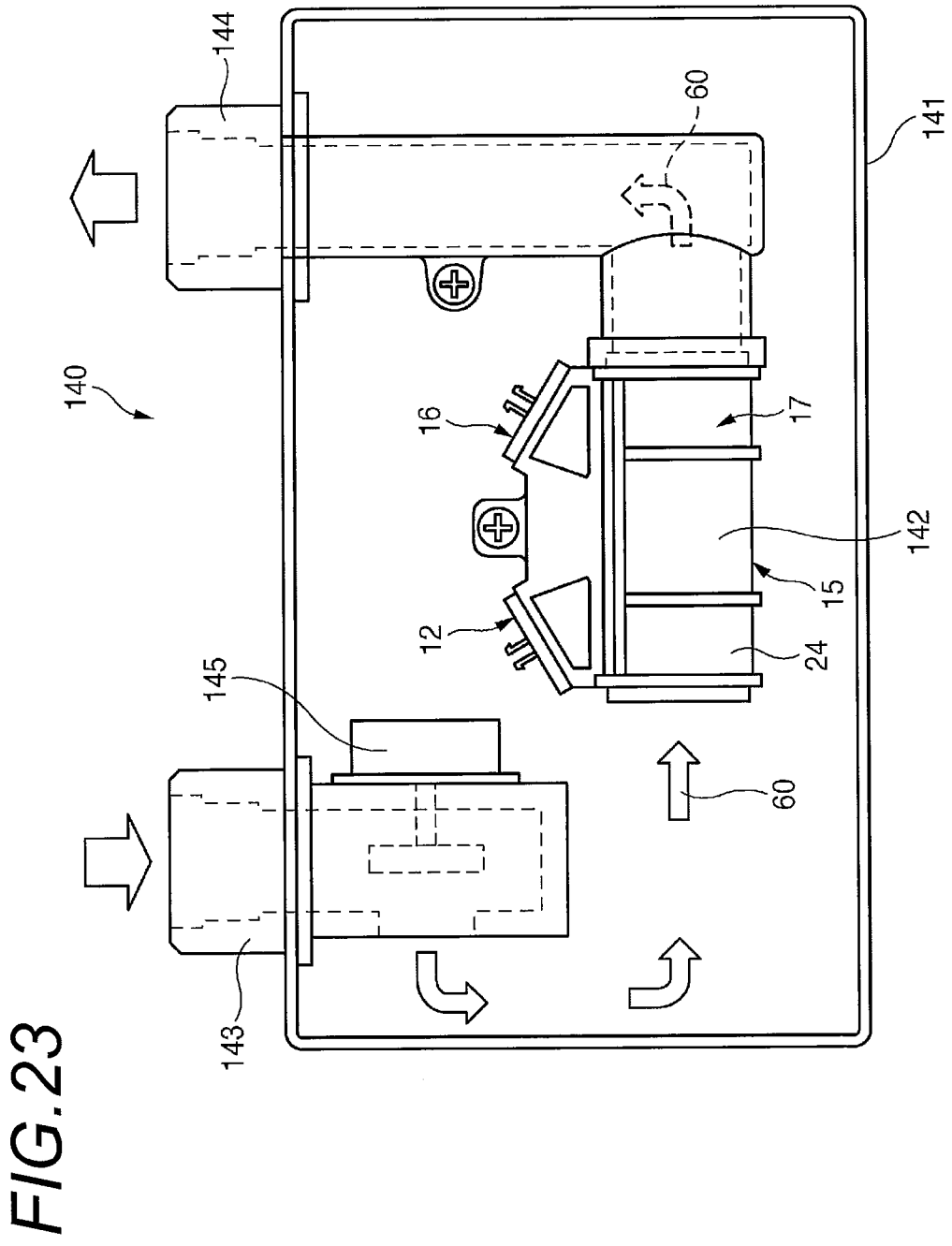
FIG. 23 is a schematic view showing an ultrasonic fluid-measuring apparatus according to an eighth embodiment of the invention.
Figure 24:
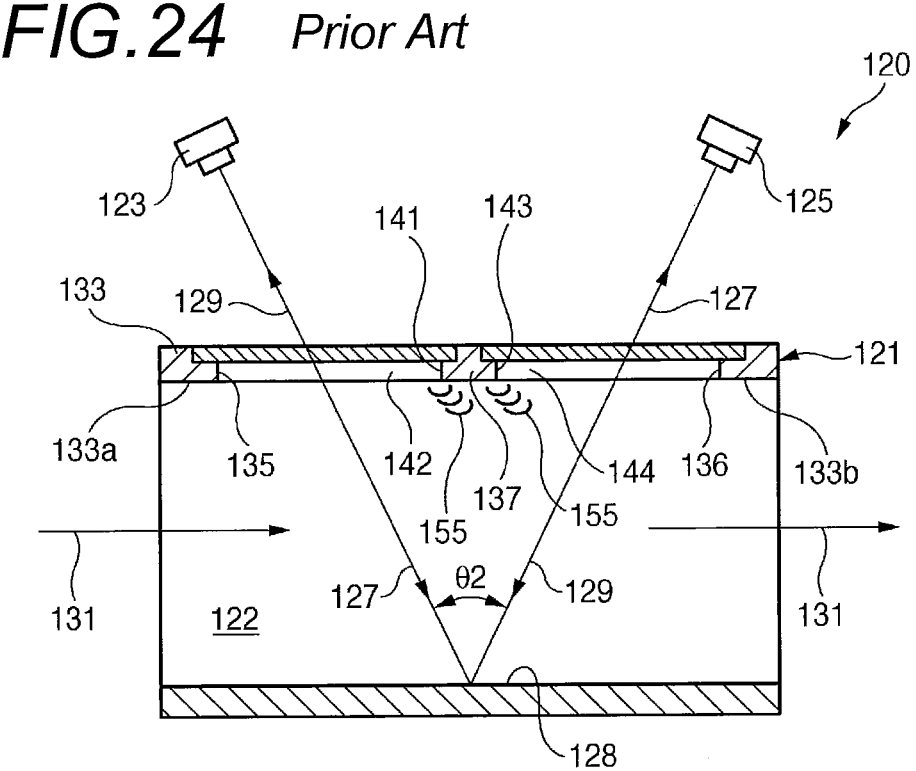
FIG. 24 is a cross-sectional view invention showing a related-art ultrasonic fluid-measuring apparatus.

Additionally, in a channel member 140 according to an eighth embodiment of the invention shown in FIG. 23, an ultrasonic fluid-measuring structure 142 is accommodated in a box-shaped apparatus housing 141, for example, is fixed with screws or the like.

The ultrasonic fluid-measuring structure 142 is basically the same as the ultrasonic fluid-measuring structure shown in the first embodiment.

The apparatus housing 141 has an entrance pipe 143 and an exit pipe 144 that allow the inside and the outside to communicate with each other.

The entrance pipe 143 is opened via a shutoff valve 145 inside the apparatus housing 141. The exit pipe 144 is coupled to an opening 18 of the ultrasonic fluid-measuring structure 142 inside the apparatus housing 141.

Accordingly, in the ultrasonic fluid-measuring apparatus 140, the fluid 60 that has flowed into the apparatus housing 141 via the entrance pipe 143 enters from the entrance of the ultrasonic fluid-measuring structure 142, and is discharged to the outside of the apparatus housing 141 via the exit pipe 144.

According to such a seventh embodiment, structure becomes simple, and low costs can be realized.

In addition, the ultrasonic fluid-measuring apparatus 10 and the ultrasonic fluid-measuring structure 12 related to the invention are not limited to the aforementioned first to sixth embodiments, and suitable changes, improvements, or the like can be made.

For example, in the first to sixth embodiments, the example in which the channel members (channel bodies) 15, 70, 80, 90, 100, and 110 are formed of resinous members has been described. However, the invention is not limited to this, and the channel members can also be formed from metal members.

Additionally, the configurations or shapes of the ultrasonic fluid-measuring apparatus 10, the measuring channel 11, the ultrasonic fluid-measuring structure 12, the accommodating section 13, the channel members 15, 70, 80, 90, 100, and 110, the ultrasonic measuring section 16, the channel bodies 17, 71, 81, 91, 101, and 111, the opening 18, the first side wall part 21, the second side wall part 22, the top plate part 23, the bottom plate part 24, the channel 26, the flat channel 27, the partition plates 28, the ultrasonic wave input/output section 31, the first ultrasonic wave input/output section 32, the second ultrasonic wave input/output section 33, the reflecting surface 35, the ultrasonic wave transmission membrane 38, the first transmitter/receiver 42, the second transmitter/receiver 43, or the like, which are used in the first to sixth embodiments, are not limited to those illustrated, and can be suitably changed.

The present application is based on Japanese Patent Application (Patent Application) No. 2009-266425 filed on Nov. 24, 2009, the contents of which are incorporated herein by reference.

The invention claimed is:

1. An ultrasonic fluid-measuring structure, comprising:
   a channel member in which a rectangular opening is continuous along a flow direction of a fluid; and
   an ultrasonic measuring section adjacent to the channel member, wherein
   the channel member includes a first side wall part adjacent to the ultrasonic measuring section, a second side wall part parallel to the first side wall part, a top plate part and a bottom plate part bridged between the first side wall part and the second side wall part, a first ultrasonic wave input/output section and a second ultrasonic wave input/output section provided in the first side wall part, and a reflecting surface provided on an inner surface of the second side wall part,
   the ultrasonic measuring section includes a first transmitter/receiver that transmits ultrasonic waves to the reflecting surface through the first ultrasonic wave input/output section and receives the ultrasonic waves reflected by the reflecting surface, and a second transmitter/receiver that transmits the ultrasonic waves to the reflecting surface through the second ultrasonic wave input/output section and receives the ultrasonic waves reflected by the reflecting surface, and
   the first ultrasonic wave input/output section and the second ultrasonic wave input/output section are adjacent to each other, and an ultrasonic wave transmission membrane through which the ultrasonic waves pass covers both the first ultrasonic wave input/output section and the second ultrasonic wave input/output section together.

2. The ultrasonic fluid-measuring structure according to claim 1, wherein
   the first side wall part, the second side wall part, the top plate part, and the bottom plate part are integral together.

3. The ultrasonic fluid-measuring structure according to claim 1, wherein
   the channel member includes a partition plate that divides an inside of the channel member into a plurality of flat channels, and
   the partition plate is molded integrally with the first side wall part and the second side wall part.

4. The ultrasonic fluid-measuring structure according to claim 3, wherein
   the ultrasonic wave transmission membrane and the partition plate comes into contact with each other.

5. The ultrasonic fluid-measuring structure according to claim 1, wherein
   the first ultrasonic wave input/output section and the second ultrasonic wave input/output section are continuous with each other.

6. An ultrasonic fluid-measuring structure, comprising:
   a channel member in which a rectangular opening is continuous along a flow direction of a fluid; and
   an ultrasonic measuring section adjacent to the channel member, wherein the channel member includes a first side wall part adjacent to the ultrasonic measuring section, a second side wall part parallel to the first side wall part, a first ultrasonic wave input/output section and a second ultrasonic wave input/output section provided in the first side wall part that define at least one opening through the first side wall part that facilitates passage of ultrasonic waves into the channel member, and a reflecting surface provided on an inner surface of the second side wall part, the ultrasonic measuring section includes a first transmitter/receiver that transmits ultrasonic waves to the reflecting surface through the first ultrasonic wave input/output section and receives the ultrasonic waves reflected by the reflecting surface, and a second transmitter/receiver that transmits the ultrasonic waves to the reflecting surface through the second ultrasonic wave input/output section and receives the ultrasonic waves reflected by the reflecting surface, and the first ultrasonic wave input/output section and the second ultrasonic wave input/output section are adjacent to each other.

7. An ultrasonic fluid-measuring apparatus using the ultrasonic fluid-measuring structure as defined in claim 1.

8. A channel member, comprising:
a body in which a rectangular opening is continuous along a flow direction of a fluid, the body including
a first side wall part and a second side wall part that are parallel to each other,
a top plate part and a bottom plate part that are bridged between the first side wall part and the second side wall part,
a first ultrasonic wave input/output section and a second ultrasonic wave input/output section that are provided in the first side wall part,
a reflecting surface provided on an inner surface of the second side wall part, and
an ultrasonic wave transmission membrane that covers the first ultrasonic wave input/output section and the second ultrasonic wave input/output section and transmits ultrasonic waves therethrough, wherein the first ultrasonic wave input/output section and the second ultrasonic wave input/output section are continuous with each other, and the ultrasonic wave transmission membrane covers both the first ultrasonic wave input/output section and the second ultrasonic wave input/output section together.

9. The channel member according to claim 8, wherein the first side wall part, the second side wall part, the top plate part, and the bottom plate part are integral together.

10. The channel member according to claim 8, comprising a partition plate that divides an inside of the channel member into a plurality of flat channels, and
the partition plate is molded integrally with the first side wall part and the second side wall part.

11. The channel member according to claim 10, wherein the ultrasonic wave transmission membrane and the partition plate come into contact with each other.

12. A channel member, comprising:
a body in which a rectangular opening is continuous along a flow direction of a fluid, the body including
a first side wall part and a second side wall part that are parallel to each other,
a first ultrasonic wave input/output section and a second ultrasonic wave input/output section that are provided in the first side wall part that define at least one opening through the first side wall part that facilitates passage of ultrasonic waves into the channel member, and
a reflecting surface provided on an inner surface of the second side wall part, wherein
the first ultrasonic wave input/output section and the second ultrasonic wave input/output section are continuous with each other.

13. An ultrasonic fluid-measuring apparatus using the channel member as defined in claim 8.

* * * * *